United States Patent
Liu

(10) Patent No.: US 10,827,142 B2
(45) Date of Patent: Nov. 3, 2020

(54) DIGITAL PIXEL ARRAY WITH ADAPTIVE EXPOSURE

(71) Applicant: Facebook Technologies, LLC, Menlo Park, CA (US)

(72) Inventor: Xinqiao Liu, Medina, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/285,873

(22) Filed: Feb. 26, 2019

(65) Prior Publication Data
US 2019/0273114 A1    Sep. 5, 2019

Related U.S. Application Data

(60) Provisional application No. 62/637,970, filed on Mar. 2, 2018.

(51) Int. Cl.
*H04N 5/3745*   (2011.01)
*G02B 27/01*   (2006.01)
(Continued)

(52) U.S. Cl.
CPC ..... *H04N 5/37452* (2013.01); *G02B 27/0172* (2013.01); *H04N 5/22525* (2018.08);
(Continued)

(58) Field of Classification Search
CPC ............... H04N 5/2353; H04N 5/2355; H04N 5/355–3559; H04N 5/3591; H04N 5/3594; H04N 5/374–37457; H01L 27/14654
See application file for complete search history.

(56) References Cited

U.S. PATENT DOCUMENTS 8,134,623 B2    3/2012 Purcell et al.
8,779,346 B2    7/2014 Fowler et al.
(Continued)

FOREIGN PATENT DOCUMENTS

EP    1746820 A1    1/2007

OTHER PUBLICATIONS

U.S. Appl. No. 15/847,517, "Non-Final Office Action", dated Nov. 23, 2018, 21 pages.
(Continued)

*Primary Examiner* — Paul M Berardesca
(74) *Attorney, Agent, or Firm* — Kilpatrick Townsend & Stockton LLP

(57) ABSTRACT

Methods and systems for light sensing are provided. In one example, an apparatus comprises and an array of pixel cells and a controller. Each pixel cell of the array of pixel cells includes a photodiode configured to generate charges upon receiving incident light and a capacitor configured to accumulate the charges generated by the photodiode. The controller is configured to: start an exposure period to accumulate the charges at the pixel cells; and based on a determination that the quantity of charges accumulated by the at least one pixel cell exceeds a pre-determined threshold: end the exposure period to cause the capacitors of the array of pixel cells to stop accumulating the charges, generate an output pixel value for each pixel cell based on the charges accumulated at the capacitor of the each pixel cell within the exposure period; and provide the output pixel values to generate an image frame.

23 Claims, 21 Drawing Sheets

(51) Int. Cl.
  *H04N 5/235* (2006.01)
  *H04N 5/355* (2011.01)
  *H04N 5/359* (2011.01)
  *H04N 5/225* (2006.01)

(52) U.S. Cl.
  CPC ......... *H04N 5/2353* (2013.01); *H04N 5/3559* (2013.01); *H04N 5/3594* (2013.01); *H04N 5/35554* (2013.01); *H04N 5/37455* (2013.01); *G02B 2027/0178* (2013.01); *H04N 5/2256* (2013.01)

(56) References Cited

U.S. PATENT DOCUMENTS

| | | | |
|---|---|---|---|
| 9,094,629 | B2 | 7/2015 | Ishibashi |
| 9,363,454 | B2 | 6/2016 | Ito et al. |
| 9,935,618 | B1* | 4/2018 | Fenigstein ........... H03K 3/3565 |
| 2003/0020100 | A1 | 1/2003 | Guidash |
| 2005/0057389 | A1 | 3/2005 | Krymski |
| 2007/0222881 | A1 | 9/2007 | Mentzer |
| 2008/0001065 | A1* | 1/2008 | Ackland .............. H04N 5/3559 250/208.1 |
| 2010/0140732 | A1* | 6/2010 | Eminoglu ......... H01L 27/14634 257/447 |
| 2010/0276572 | A1 | 11/2010 | Iwabuchi et al. |
| 2011/0254986 | A1 | 10/2011 | Nishimura et al. |
| 2012/0133807 | A1 | 5/2012 | Wu et al. |
| 2012/0262616 | A1 | 10/2012 | Sa et al. |
| 2013/0056809 | A1 | 3/2013 | Mao et al. |
| 2013/0057742 | A1 | 3/2013 | Nakamura et al. |
| 2013/0141619 | A1 | 6/2013 | Lim et al. |
| 2013/0207219 | A1 | 8/2013 | Ahn |
| 2013/0299674 | A1 | 11/2013 | Fowler et al. |
| 2014/0042299 | A1 | 2/2014 | Wan et al. |
| 2014/0313387 | A1* | 10/2014 | Vogelsang ......... H04N 5/35527 348/308 |
| 2015/0189209 | A1 | 7/2015 | Yang et al. |
| 2015/0279884 | A1 | 10/2015 | Kusumoto |
| 2015/0312502 | A1 | 10/2015 | Borremans |
| 2016/0028974 | A1 | 1/2016 | Guidash et al. |
| 2016/0088253 | A1 | 3/2016 | Tezuka |
| 2016/0100115 | A1 | 4/2016 | Kusano |
| 2016/0165160 | A1 | 6/2016 | Hseih et al. |
| 2016/0360127 | A1 | 12/2016 | Dierickx et al. |
| 2017/0099422 | A1* | 4/2017 | Goma .................. H01L 27/146 |

OTHER PUBLICATIONS

Cho, et al., "A Low Power Dual CDS for a Column-Parallel CMOS Image Sensor", Journal of Semiconductor Technology and Science, vol. 12, No. 4, Dec. 30, 2012, 9 pages.

European Application No. EP18179838.0, "Partial European Search Report", dated Dec. 5, 2018, 14 pages.

European Application No. EP18179846.3, "Extended European Search Report", dated Dec. 7, 2018, 10 pages.

European Application No. EP18179851.3, "Extended European Search Report", dated Dec. 7, 2018, 8 pages.

International Application No. PCT/US2018/039350, "International Search Report and Written Opinion", dated Nov. 15, 2018, 13 pages.

International Application No. PCT/US2018/039352, "International Search Report and Written Opinion", dated Oct. 26, 2018, 10 pages.

International Application No. PCT/US2018/039431, "International Search Report and Written Opinion", dated Nov. 7, 2018, 14 pages.

* cited by examiner

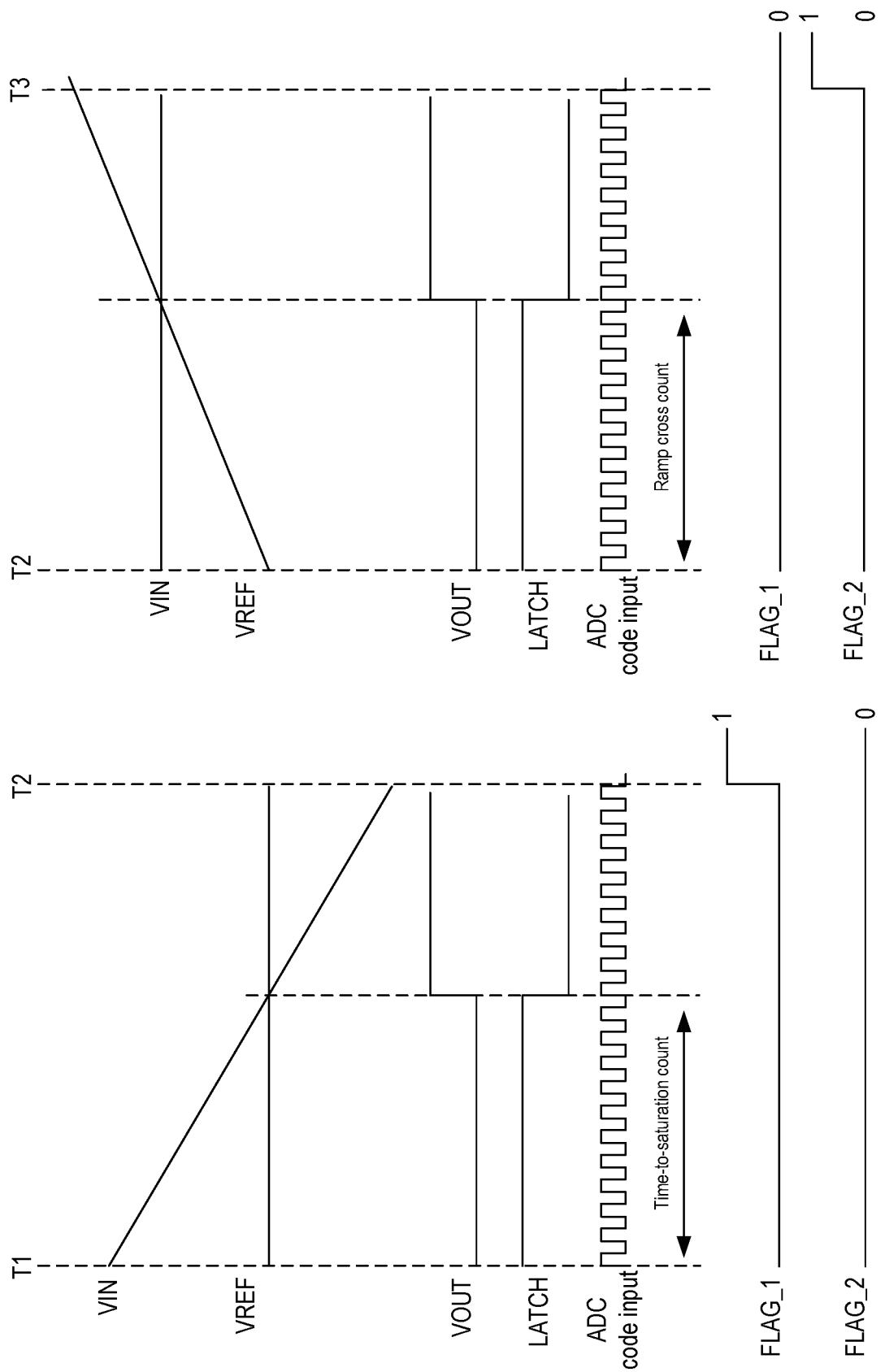

DIGITAL PIXEL ARRAY WITH ADAPTIVE EXPOSURE

RELATED APPLICATION

This patent application claims priority to U.S. Provisional Patent Application Ser. No. 62/637,970, filed Mar. 2, 2018, entitled "Digital Pixel Array With Adaptive Exposure," which is assigned to the assignee hereof and is incorporated herein by reference in its entirety for all purposes.

BACKGROUND

The disclosure relates generally to image sensors, and more specifically to pixel cell structure including interfacing circuitries for determining light intensity for image generation.

A typical image sensor includes a photodiode to sense incident light by converting photons into charges (e.g., electrons or holes). The image sensor further includes a floating node configured as a capacitor to collect the charges generated by the photodiode during an exposure period. The collected charges can develop a voltage at the capacitor. The voltage can be buffered and fed to an analog-to-digital converter (ADC), which can convert the voltage into a digital value representing the intensity of the incident light.

SUMMARY

The present disclosure relates to image sensors. More specifically, and without limitation, this disclosure relates to a pixel cell array that supports multi-stage readouts in an exposure period to generate an image frame.

In one example, an apparatus is provided. The apparatus comprises an array of pixel cells, each pixel cell including a photodiode configured to generate charges upon receiving incident light and a capacitor configured to accumulate the charges generated by the photodiode. The apparatus further comprises a controller configured to: start an exposure period to enable the capacitors of the array of pixel cells to accumulate the charges; determine whether a quantity of charges accumulated by at least one pixel cell of the array of pixel cells exceeds a pre-determined threshold; and based on a determination that the quantity of charges accumulated by the at least one pixel cell exceeds a pre-determined threshold: end the exposure period to cause the capacitors of the array of pixel cells to stop accumulating the charges, generate an output pixel value for each pixel cell based on the charges accumulated at the capacitor of the each pixel cell within the exposure period; and provide the output pixel values for generation of an image frame.

In some aspects, the controller is further configured to: determine an intermediate pixel value for each pixel cell based on the charges accumulated at the capacitor of the each pixel cell within the exposure period; determine a scale value based on a duration of the ended exposure period; and scale each of the intermediate pixel values using the scale value to generate the output pixel values.

In some aspects, the pre-determined threshold is set based on an intensity range of incident light that saturates the at least one pixel cell. In some aspects, the pre-determined threshold is set based on a capacity of the capacitor of the at least one pixel cell for accumulating the charges.

In some aspects, the apparatus further comprises one or more analog-to-digital converters (ADC) configured to generate a digital pixel value based on at least one of: a measurement of time for the capacitor of a pixel cell to accumulate a quantity of charges equal to the pre-determined threshold, or a measurement of the quantity of charges accumulated at the capacitor when the exposure period ends; and a selection module configured to couple each pixel cell of the array of pixel cells sequentially to the one or more ADCs to generate the digital pixel value for the each pixel cell based on the charges accumulated at the photodiode of the each pixel cell.

In some aspects, the controller is configured to, in each exposure period of a plurality of exposure periods: select a pixel cell from the array of the pixel cells as the at least one pixel cell; control the selection module to couple the selected pixel cell to the one or more ADCs to determine whether a quantity of charges accumulated at the selected pixel cell exceeds the pre-determined threshold; and responsive to determining that the quantity of charges accumulated at the selected pixel cell exceeds the pre-determined threshold, end the each exposure period.

In some aspects, the controller is configured to select the same pixel cell in the each exposure period of the plurality of exposure periods. In some aspects, the controller is configured to select different pixel cells in a first exposure period and a second exposure period of the plurality of exposure periods. In some aspects, the controller is also configured to select the pixel cell in a current exposure period based on the digital pixel value of the pixel cell exceeding the pre-determined threshold in a prior exposure period. In some aspects, the controller is configured to select the pixel cell based on a random function.

In some aspects, each pixel cell of the apparatus may include an analog-to-digital converter (ADC) configured to generate a digital pixel value for the each pixel cell based on at least one of: a measurement of time for the capacitor of the each pixel cell to accumulate a quantity of charges equal to the pre-determined threshold, or a measurement of the quantity of charges accumulated at the capacitor when the exposure period ends. The controller may monitor for an indication that a quantity of charges accumulated at at least one of the pixel cells exceeds the pre-determined threshold; and end the exposure period for each pixel cell based on receiving the indication.

In some aspects, the exposure period may have a default end time. The controller may end the exposure period before the default end time based on the determination that the quantity of charges accumulated by the at least one pixel cell exceeds the pre-determined threshold. The default end time may be preset based on an ambient light intensity.

In some aspects, the array of pixel cells of the apparatus is a first array of pixel cells. The apparatus may further comprise a second array of pixel cells. The controller may start the exposure period at a first time for the first array and for the second array; end the exposure period at a second time for the first array; and end the exposure period at a third time different from the second time for the second array.

In one example, a method is provided. The method may comprise: starting an exposure period to enable a capacitor of each pixel cell of an array of pixel cells to accumulate charges generated by a photodiode included in the each pixel cell; determining whether a quantity of charges accumulated by at least one pixel cell of the array of pixel cells exceeds a pre-determined threshold; and based on determining that the quantity of charges accumulated by the at least one pixel cell exceeds a pre-determined threshold: ending the exposure period to cause the capacitors of the array of pixel cells to stop accumulating the charges, generating an output pixel value for each pixel cell based on the charges accumulated at the capacitor of the each pixel cell within the exposure period; and providing the output pixel values for generation of an image frame.

In some aspects, the method further comprise: determining an intermediate pixel value for each pixel cell based on the charges accumulated at the capacitor of the each pixel cell within the exposure period; determining a scale value based on a duration of the ended exposure period; and scaling each of the intermediate pixel values using the scale value to generate the output pixel values.

In some aspects, the method further comprises: generating, using an ADC, a digital pixel value for each pixel cell based on at least one of: a measurement of time for the capacitor of the each pixel cell to accumulate a quantity of charges equal to the pre-determined threshold, or a measurement of the quantity of charges accumulated at the capacitor of the each pixel cell when the exposure period ends.

In some aspects, the method further comprises, in each exposure period of a plurality of exposure periods: selecting a pixel cell from the array of the pixel cells as the at least one pixel cell; controlling the ADC to determine whether a quantity of charges accumulated at the selected pixel cell exceeds the pre-determined threshold; and responsive to determining that the quantity of charges accumulated at the selected pixel cell exceeds the pre-determined threshold, ending the each exposure period. In some aspects, the same pixel cell is selected in the each exposure period of the plurality of exposure periods. In some aspects, different pixel cells in a first exposure period are selected in a first exposure period and in a second exposure period of the plurality of exposure periods. In some aspects, the pixel cell is selected in a current exposure period based on the digital pixel value of the pixel cell exceeding the pre-determined threshold in a prior exposure period. In some aspects, the pixel cell is selected based on a random function.

BRIEF DESCRIPTION OF THE DRAWINGS

Illustrative embodiments are described with reference to the following figures.

FIGS. 12A, 12B, 12C, and 12D illustrate example methods for determining light intensity.

Figure 1A:
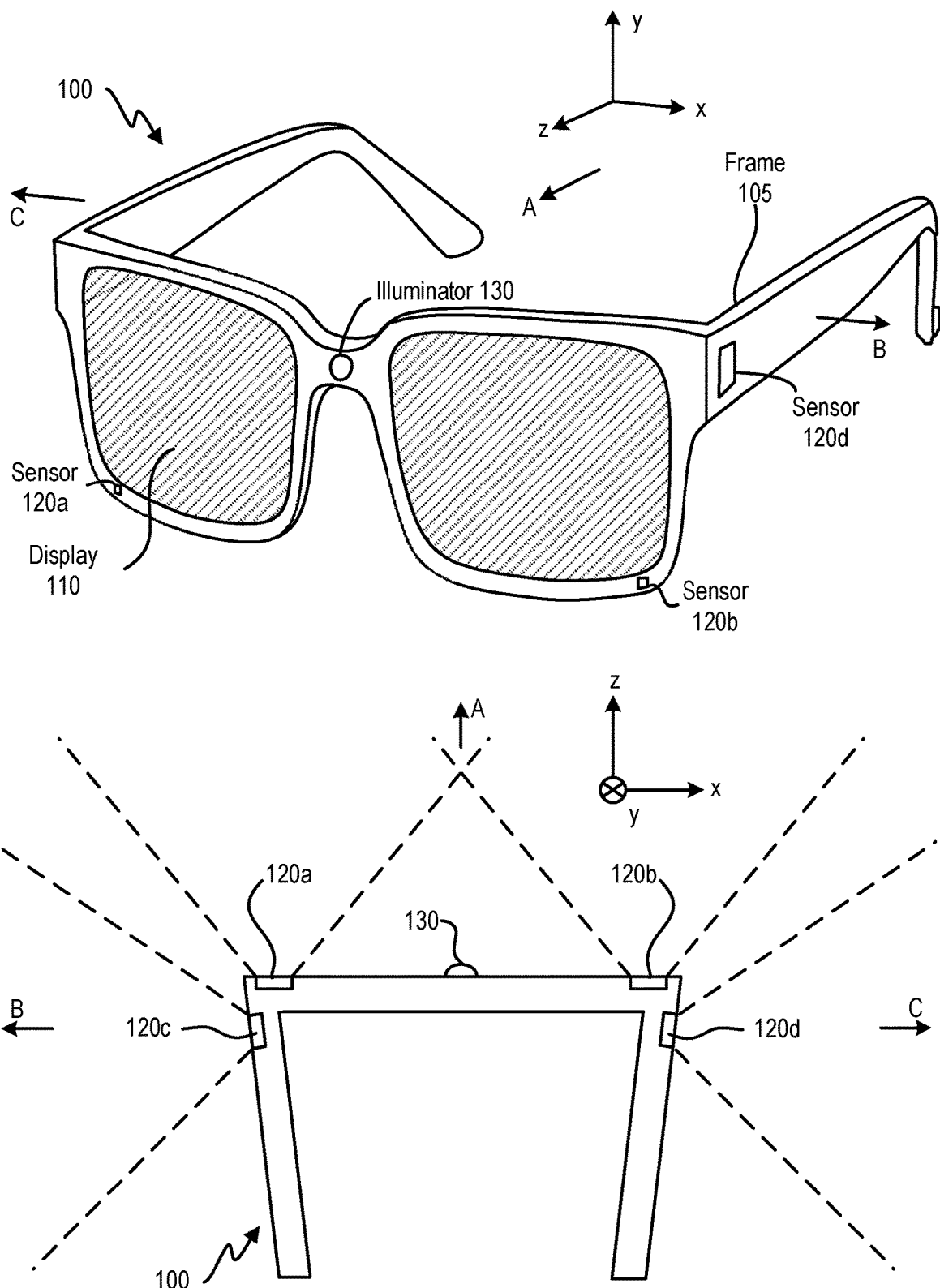
FIGS. 1A and 1B are diagrams of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes a photodiode to sense incident light by converting photons into charges (e.g., electrons or holes). The image sensor further includes a floating node configured as a capacitor to collect the charges generated by the photodiode during an exposure period. The collected charges can develop a voltage at the capacitor. The voltage can be buffered and fed to an analog-to-digital converter (ADC), which can convert the voltage into digital pixel data representing the intensity of the incident light. Each of the digital values has a bit depth (e.g., 8 bits, 16 bits, etc.) determined based on the quantization resolution of the ADC.

An image can be generated based on intensity data provided by an array of image sensors, with each image sensor forming a pixel cell that corresponds to a pixel of the image. The array of pixel cells can be arranged into rows and columns, with each pixel cell generating a voltage representing the intensity for a pixel associated with a particular location in the image. A number of pixels included in the array can determine a resolution of the generated image. An image can be reconstructed based on the digital intensity data of each pixel generated by the ADC. The digital intensity data of each pixel of an image frame can be stored in a frame buffer for subsequent processing.

The digital value generated by the ADC, which reflects a number of charges stored at the floating node within an exposure period, may correlate to the intensity of the incident light. However, the degree of correlation can be affected by different factors. For example, the quantity of charges stored in the floating node can be directly related to the intensity of the incident light until the floating node reaches a saturation limit. Beyond the saturation limit, the floating node may be unable to accumulate additional charges generated by the photodiode, and the additional charges may be leaked and not stored. As a result, the quantity of the charges stored at the floating node may be lower than the quantity of charges actually generated by the photodiode. The saturation limit may determine an upper limit of the measurable light intensity of the image sensor, and an image sensor may become inoperable (or generate a low quality image) in an environment with strong ambient light.

Moreover, saturating the floating nodes of the pixel cells may cause other effects that can further degrade the quality of imaging, such as blooming. Blooming occurs when the image sensor is exposed to a high intensity light source (e.g., a light bulb) in a scene, which can saturate the floating nodes of some but not all of the pixel cells. Charges may leak from the saturated pixel cells into other neighboring pixel cells and contaminate the charges stored in those neighboring pixel cells. The contamination can degrade the correlation between the incident light intensity and the accumulated charges in those neighboring pixel cells. The leakage can create an effect of a blanket of light that obscures the rest of the scene in the image and degrades the imaging of the scene. Because of the effect of saturation and blooming, the image sensor may also become inoperable to capture the image of a scene including a high intensity light source.

Image sensors can be found in many different applications. As an example, image sensors are included in digital imaging devices (e.g., digital cameras, smart phones, etc.) to provide digital imaging. As another example, image sensors can be configured as input devices to control or influence the operation of a device, such as controlling or influencing the display content of a near-eye display in wearable virtual-reality (VR) systems and/or augmented-reality (AR) and/or mixed reality (MR) systems. For example, the image sensors can be used to generate physical image data of a physical environment in which a user is located. The physical image data can be provided to a location tracking system. A location tracking system can obtain the digital intensity data of an image frame from the frame buffer and search for patterns of intensity data representing certain image features to identify one or more physical objects in the image. The image locations of the physical objects can be tracked to determine the locations of the physical objects in the environment (e.g., through triangulation). The location information of the physical objects can be provided to a simultaneous localization and mapping (SLAM) algorithm to determine, for example, a location of the user, an orientation of the user, and/or a path of movement of the user in the physical environment. The image data can also be used to, for example, generate stereo depth information for measuring a distance between the user and the physical object in the physical environment, to track a movement of the physical object (e.g., user's eyeballs), etc. In all these examples, the VR/AR/MR system can generate and/or update virtual image data based on the information (e.g., a location of a user, a gaze point direction, etc.) obtained from the physical image data, and provide the virtual image data for displaying to the user via the near-eye display to provide an interactive experience.

A wearable VR/AR/MR system may operate in environments with a very wide range of light intensities. For example, the wearable VR/AR/MR system may be able to operate in an indoor environment or in an outdoor environment, and/or at different times of the day, and the light intensity of the operation environment of the wearable VR/AR/MR system may vary substantially. Moreover, the wearable VR/AR/MR system may also include the aforementioned NIR eyeball tracking system, which may require projecting lights of very low intensity into the eyeballs of the user to prevent damaging the eyeballs. As a result, the image sensors of the wearable VR/AR/MR system may need to have a wide dynamic range to be able to operate properly (e.g., to generate an output that correlates with the intensity of incident light) across a very wide range of light intensities associated with different operating environments. The image sensors of the wearable VR/AR/MR system may also need to generate images at sufficient high speed to allow tracking of the user's location, orientation, gaze point, etc. Image sensors with relatively limited dynamic ranges and which generate images at relatively low speed may not be suitable for such a wearable VR/AR/MR system. However, as described above, the effects of saturation and blooming on image sensing may limit the applications of the wearable VR/AR/MR system in an environment of strong ambient light or in an environment with high intensity light sources, which can degrade user experience.

This disclosure relates to an image sensor. The image sensor may include an array of pixel cells, with each pixel cell including a photodiode configured to generate charges upon receiving incident light, and a capacitor configured to accumulate the charges generated by the photodiode. The image sensor may further include a controller configured to start an exposure period to enable the capacitors of the array of pixel cells to accumulate the charges, and determine whether a quantity of charges accumulated by at least one pixel cell of the array of pixel cells exceed a pre-determined threshold. Based on a determination that the quantity of charges accumulated by the at least one pixel cell exceeds a pre-determined threshold, the controller can stop the exposure period to cause the capacitors of the array of pixel cells to stop accumulating the charges, and generate an output pixel value for each pixel cell based on the charges accumulated at the capacitor of the each pixel cell within the exposure period. The output pixel values can be provided to, for example, an image processor to generate an image frame.

The disclosed techniques can dynamically adjust an exposure period for a pixel cell array to, for example, reduce the likelihood of saturating the pixel cells in a case where the pixel cell array is exposed to high intensity light, which also reduces the likelihood of blooming. Moreover, the dynamic adjustment can be performed within the exposure period of a single image frame, which enables the adjustment to be more responsive to a change in the intensity of light received by the pixel cell array caused by, for example, a movement of objects and/or light sources in the environment, a movement of the wearable VR/AR/MR system that incorporates the pixel cell array, etc. All these can extend the dynamic range of the pixel cell array and enable the wearable VR/AR/MR system to perform accurate image sensing for a wider range of applications, thereby improving user experience.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
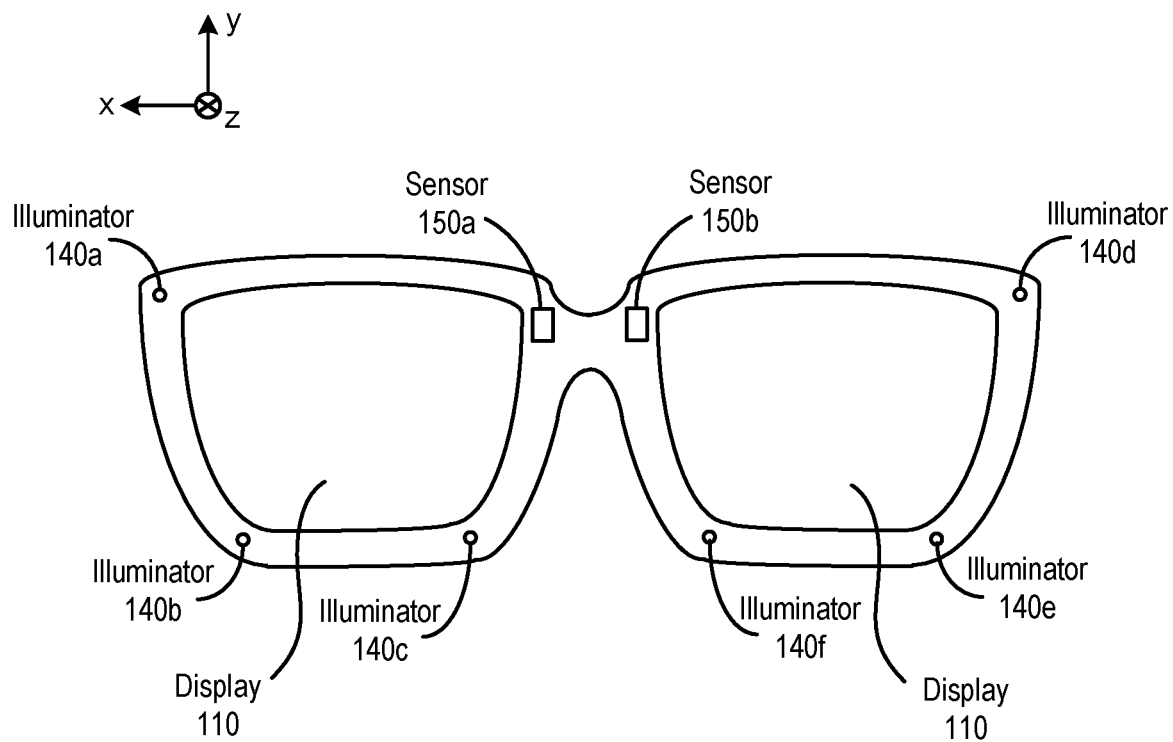
Figure 1B:
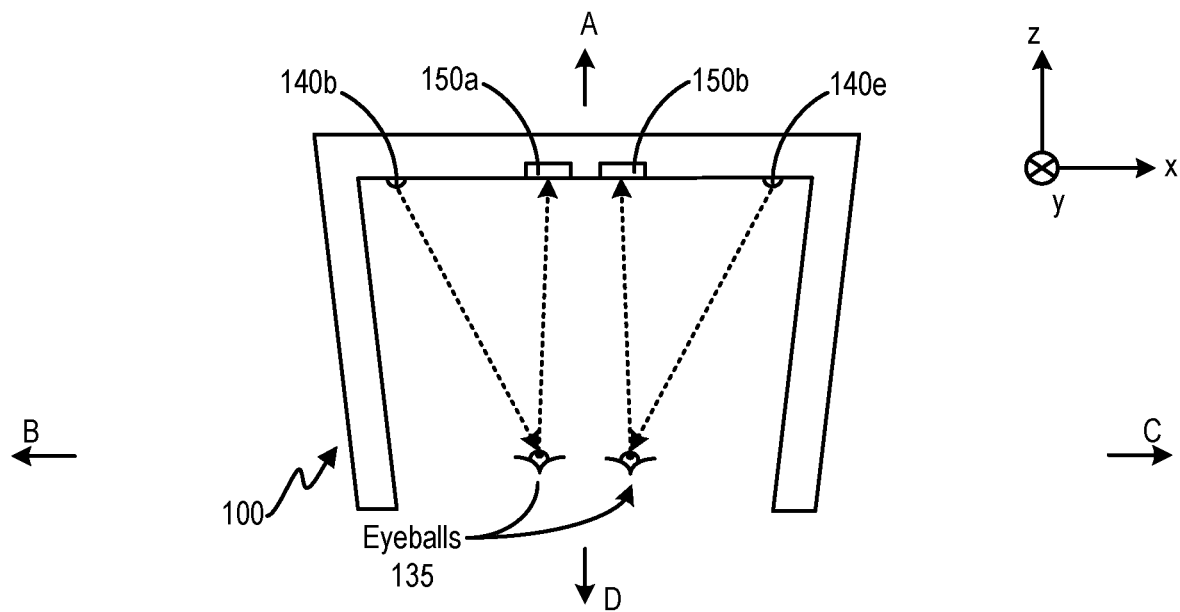

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure period for all of the pixel cells involved in generating the image frame, as well as high speed for converting the sensor outputs into digital values for image generation. Moreover, as discussed above, the image sensors also need to be able to operate at an environment with low light intensity.

Figure 2:
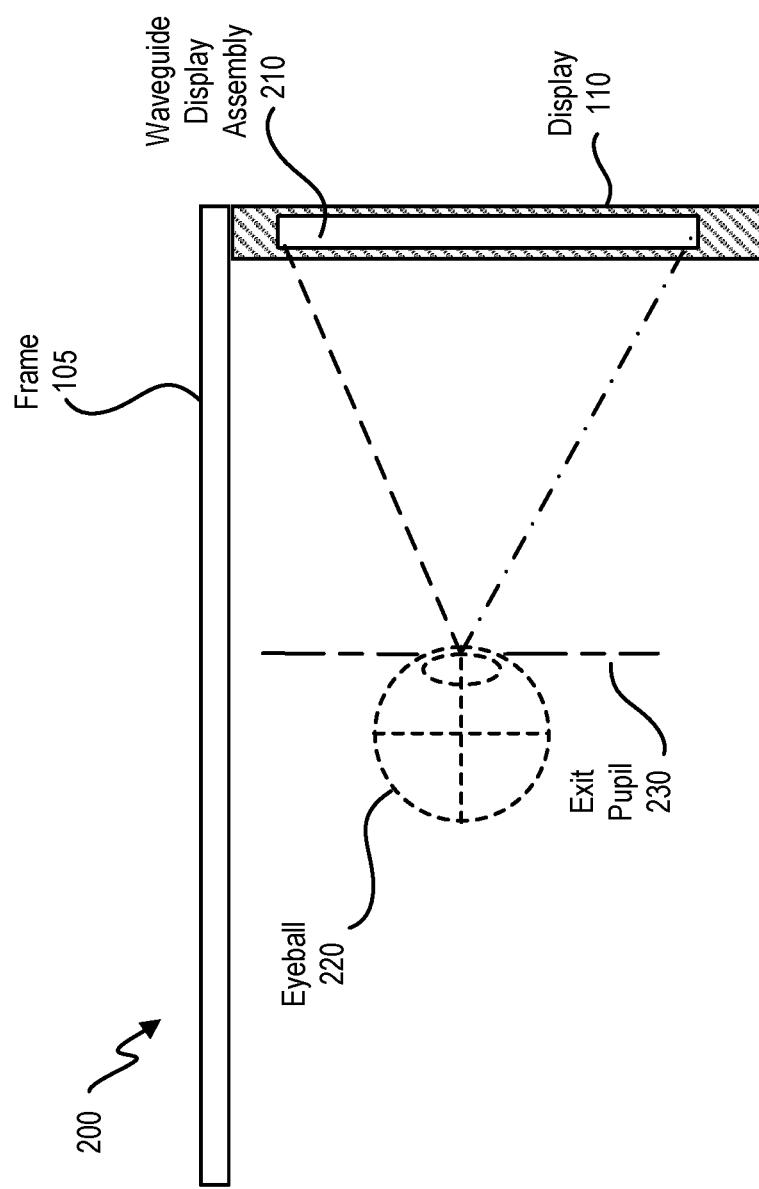
FIG. 2 is an embodiment of a cross section of the near-eye display.

FIG. 2 is an embodiment of a cross section 200 of near-eye display 100 illustrated in FIG. 1A and FIG. 1B. Display 110 includes at least one waveguide display assembly 210. An exit pupil 230 is a location where a single eye 220 of the user is positioned in an eyebox region when the user wears the near-eye display 100. For purposes of illustration, FIG. 2 shows the cross section 200 with eye 220 and a single waveguide display assembly 210, but a second waveguide display is used for a second eye of a user.

Waveguide display assembly 210 is configured to direct image light to an eyebox located at exit pupil 230 and to eye 220. Waveguide display assembly 210 may be composed of one or more materials (e.g., plastic, glass, etc.) with one or more refractive indices. In some embodiments, near-eye display 100 includes one or more optical elements between waveguide display assembly 210 and eye 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
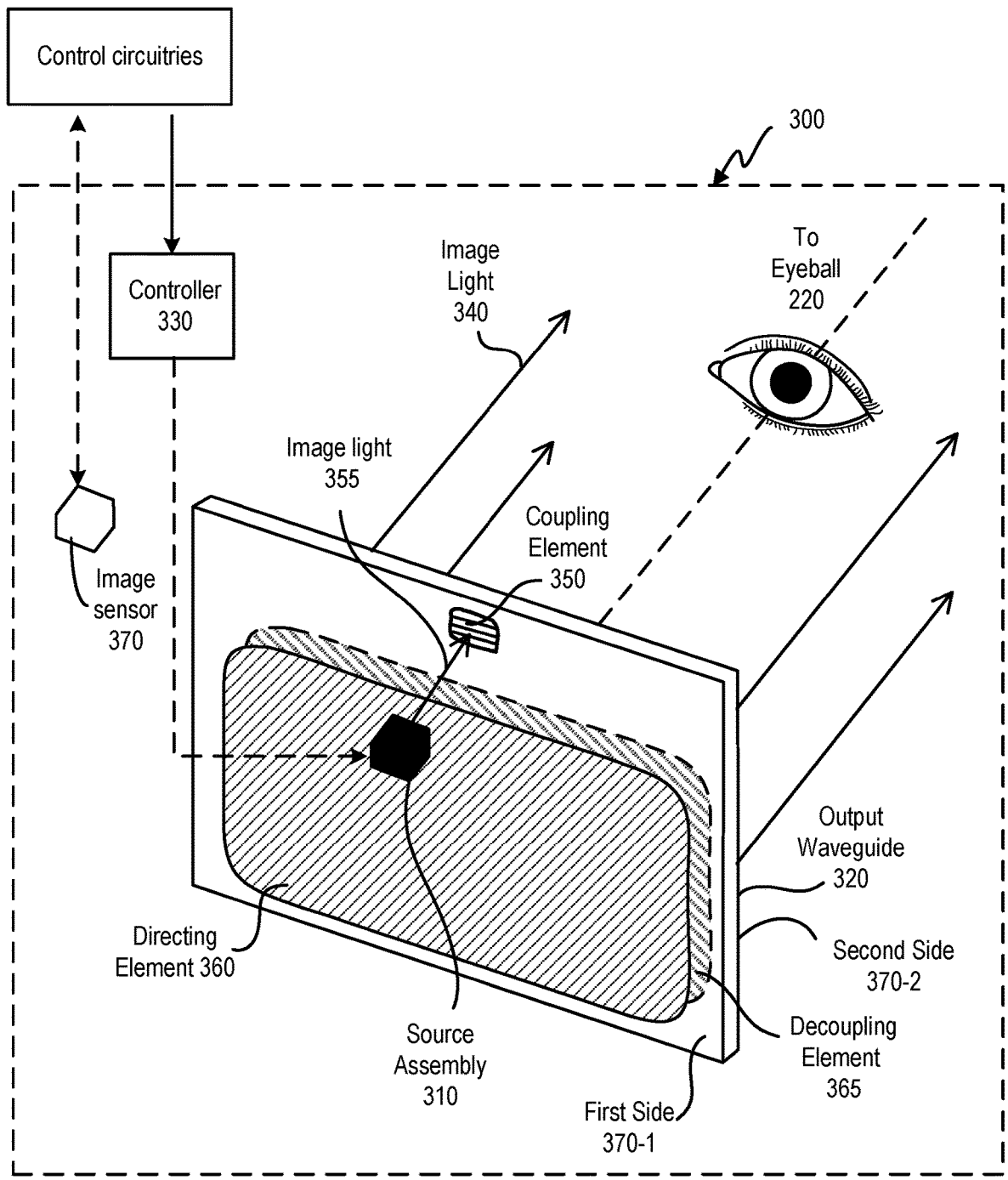
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eye 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eye 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eye 220 with a large field of view (FOV). For example, the expanded image light 340 is provided to the user's eye 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors

150a and 150b of FIG. 1B to generate image data of eye 220 (e.g., for gaze point determination) of the user. Image sensor 370 may interface with control circuitries that are not located within waveguide display 300 (e.g., in a remote console). Image sensor 370 may provide image data to the control circuitries, which may determine, for example, a location of the user, a gaze point of the user, etc., and determine the content of the images to be displayed to the user. The control circuitries can transmit instructions to controller 330 related to the determined content. Based on the instructions, controller 330 can control the generation and outputting of image light 355 by source assembly 310.

Figure 4:
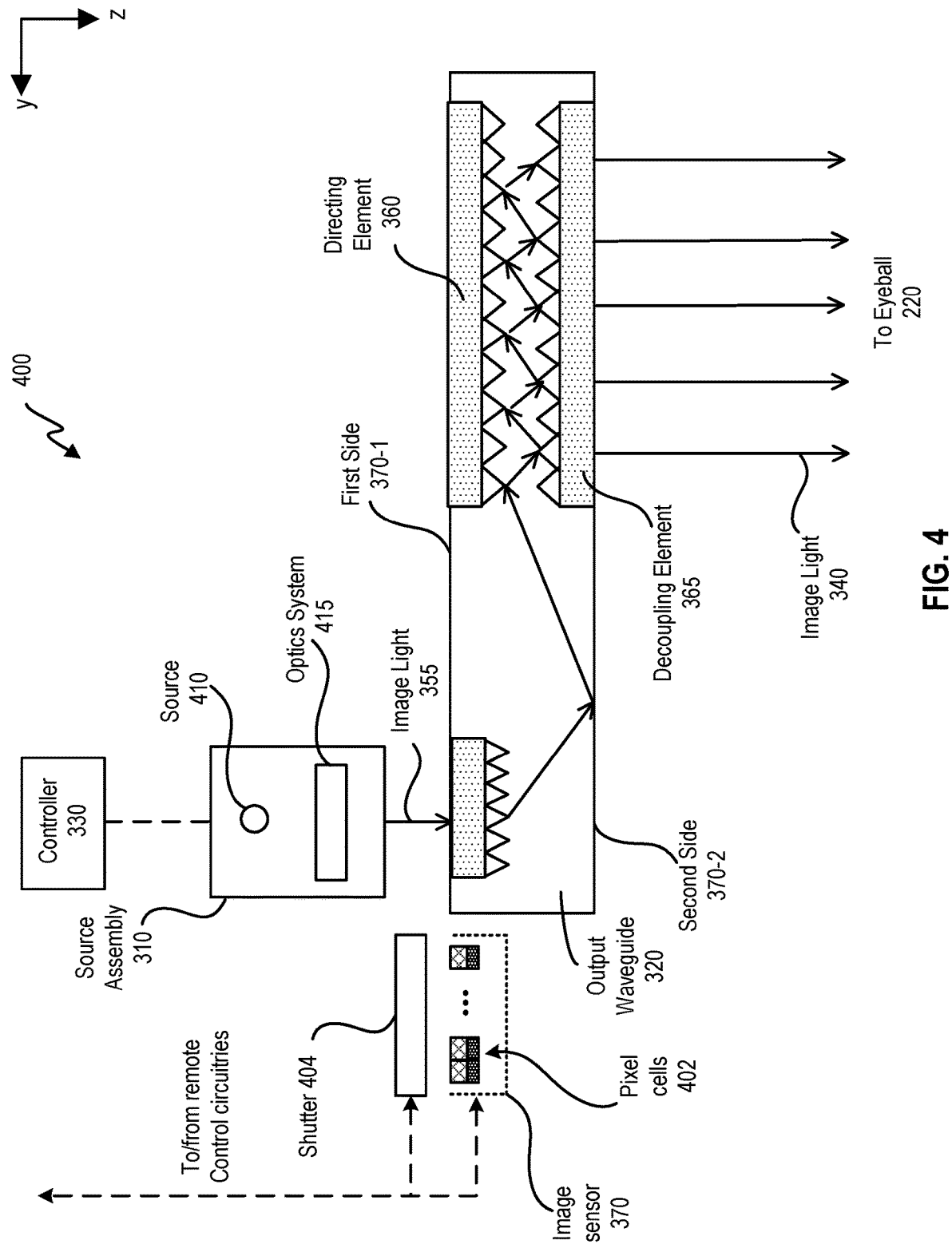
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the control circuitries, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
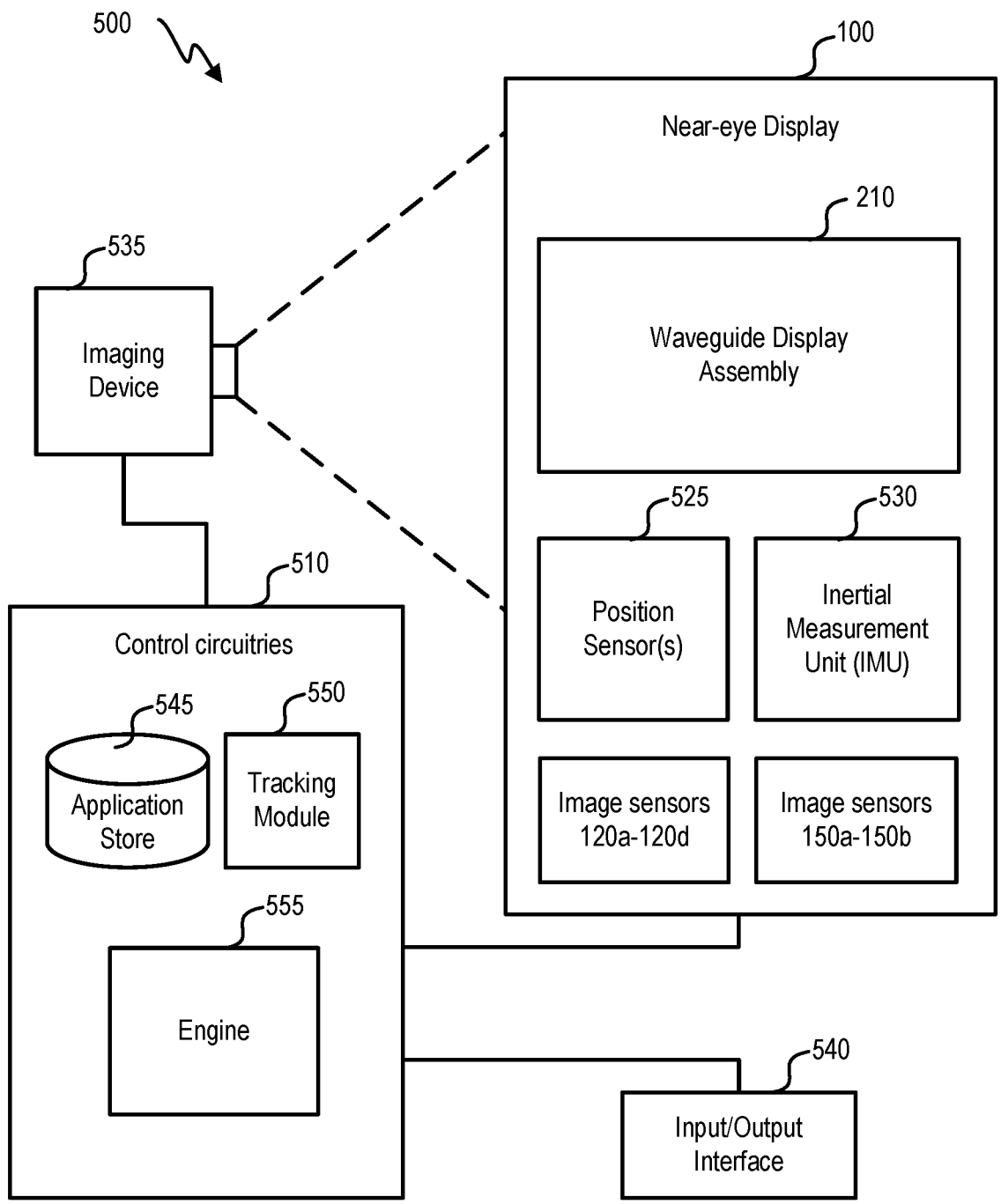
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, for identifying an object of interest of the user, etc.

The input/output interface 540 is a device that allows a user to send action requests to the control circuitries 510. An action request is a request to perform a particular action. For example, an action request may be to start or end an application or to perform a particular action within the application.

Control circuitries 510 provides media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback application, or other suitable applications.

Tracking module 550 tracks movements of near-eye display 100 using, for example, image date from the imaging device 535. As to be discussed in more detail below, tracking module 550 may obtain pixel data of an image frame captured by imaging device 535 and identify one or more objects in the image frame based on the pixel data, determine the image locations of the one or more objects across multiple image frames, and determine the physical locations of the one or more objects based on the image locations. In some examples, the physical locations information can be provided to a SLAM algorithm operated in tracking module 550 to generate position information of near-eye display 100. In some examples, the image locations information can be used to generate position information of the identified object.

Engine 555 executes applications within system 500 and receives position information, acceleration information, velocity information, and/or predicted future positions of near-eye display 100 from tracking module 550. Engine 555 can also receive position information of a physical object (other than near-eye display 100) from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), a distance between an object and user (e.g., based on image data provided by imaging device 535).

Figure 6A:
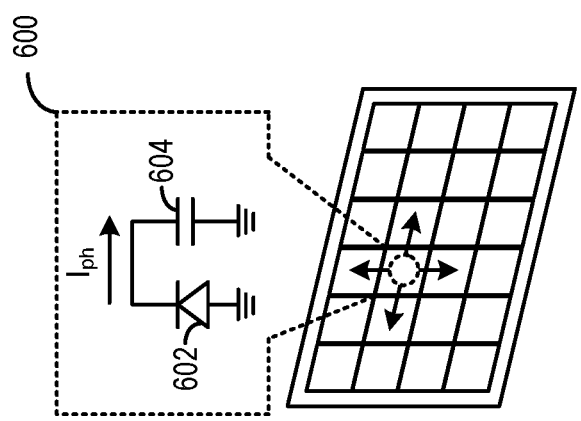
FIGS. 6A and 6B illustrate examples of exposure time adjustment which can be performed by near-eye display of FIG. 5.
Figure 6A:
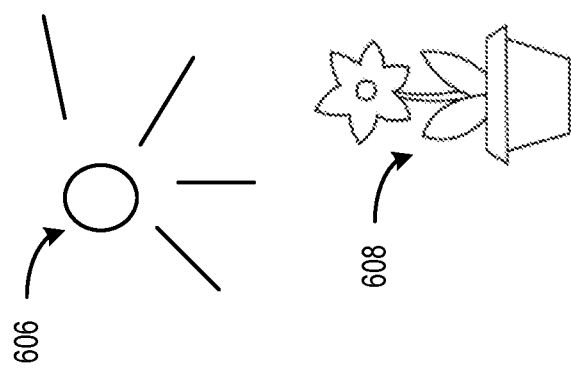
Figure 6B:
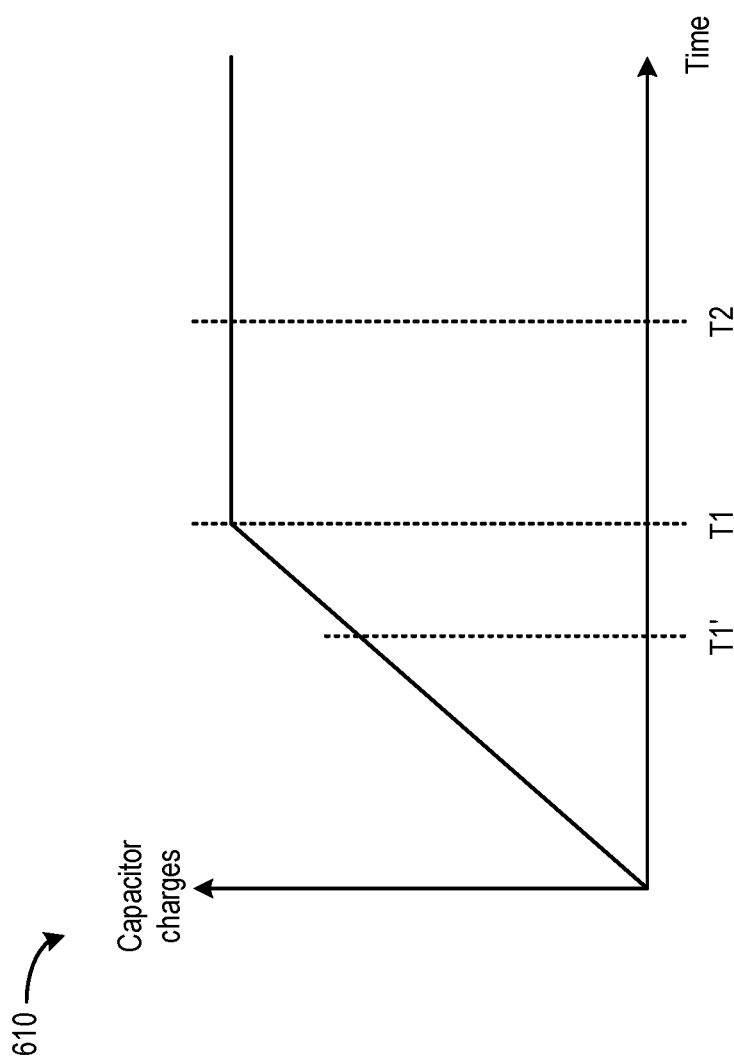

FIGS. 6A-6B illustrate examples of operations which can be performed to extend the dynamic range of image sensor 370. Image sensor 370 may include a pixel cell array, which includes pixel cell 600. Pixel cell 600 includes a photodiode 602 and a capacitor 604. In the example of FIG. 6A, image sensor 370 can be used to capture an image of a scene including a light source 606 and an object 608. Due to its location within the pixel cell array, pixel cell 600 may receive high intensity light from light source 606.

FIG. 6B illustrates a graph 610 which shows the change of quantity of charges accumulated at capacitor 604 with respect to time when photodiode 602 is exposed to light. As shown in FIG. 6B, at the beginning (e.g., before time T1) capacitor 604 has the capacity to accumulate the charges generated by photodiode 602, and the quantity of charges increases with time. Before time T1, the quantity of charges stored at capacitor 604, and the rate at which the quantity of charges increases, can be correlated to the intensity of light received by photodiode 602. On the other hand, after time T1, capacitor 604 becomes full, and a saturation limit for pixel cell 600 has been reached. As a result, beyond time T1, capacitor 604 may stop accumulating charges, and the quantity of charges accumulated in capacitor 604 may remain substantially constant. The quantity of charges accumulated in capacitor 604 at a time after T1 (e.g., at time T2) may not be correlated to the intensity of light received by photodiode 602. Moreover, beyond time T1, if photodiode 602 remains exposed to the incident light and continues generating charges, those charges may leak into pixel cells neighboring pixel 600 and contaminate the capacitors in those pixel cells, which causes blooming as discussed above.

Embodiments of the present disclosure can reduce the likelihood of saturating pixel cell 600 (and the resulting blooming effect) by detecting the onset of saturation at pixel cell 600. The detection of the onset of saturation can be based on, for example, determining whether the charges stored in capacitor 604 exceed a pre-determined threshold. The pre-determined threshold can be set based on a certain percentage of the saturation capacity of capacitor 604 such that when the pre-determined threshold is reached, the pixel cell 600 is not saturated. Upon determining that the pre-determined threshold is reached, the exposure period can be stopped to prevent photodiode 602 from transferring additional charges to capacitor 604. In the example of FIG. 6B, the exposure period can end before time T1 (e.g., at time T1'). With such arrangements, the likelihood of pixel cell 600 being saturated can be reduced. A pixel value can be generated based on, for example, measuring the quantity of charges accumulated in capacitor 604 at time T1, or measuring the duration of time T1', which reflects the rate at which the charges are accumulated. In both cases, the pixel value can represent the intensity of light received by photodiode 602 more accurately, and the upper limit of the dynamic range of image sensor 370 can be extended.

Figure 7A:
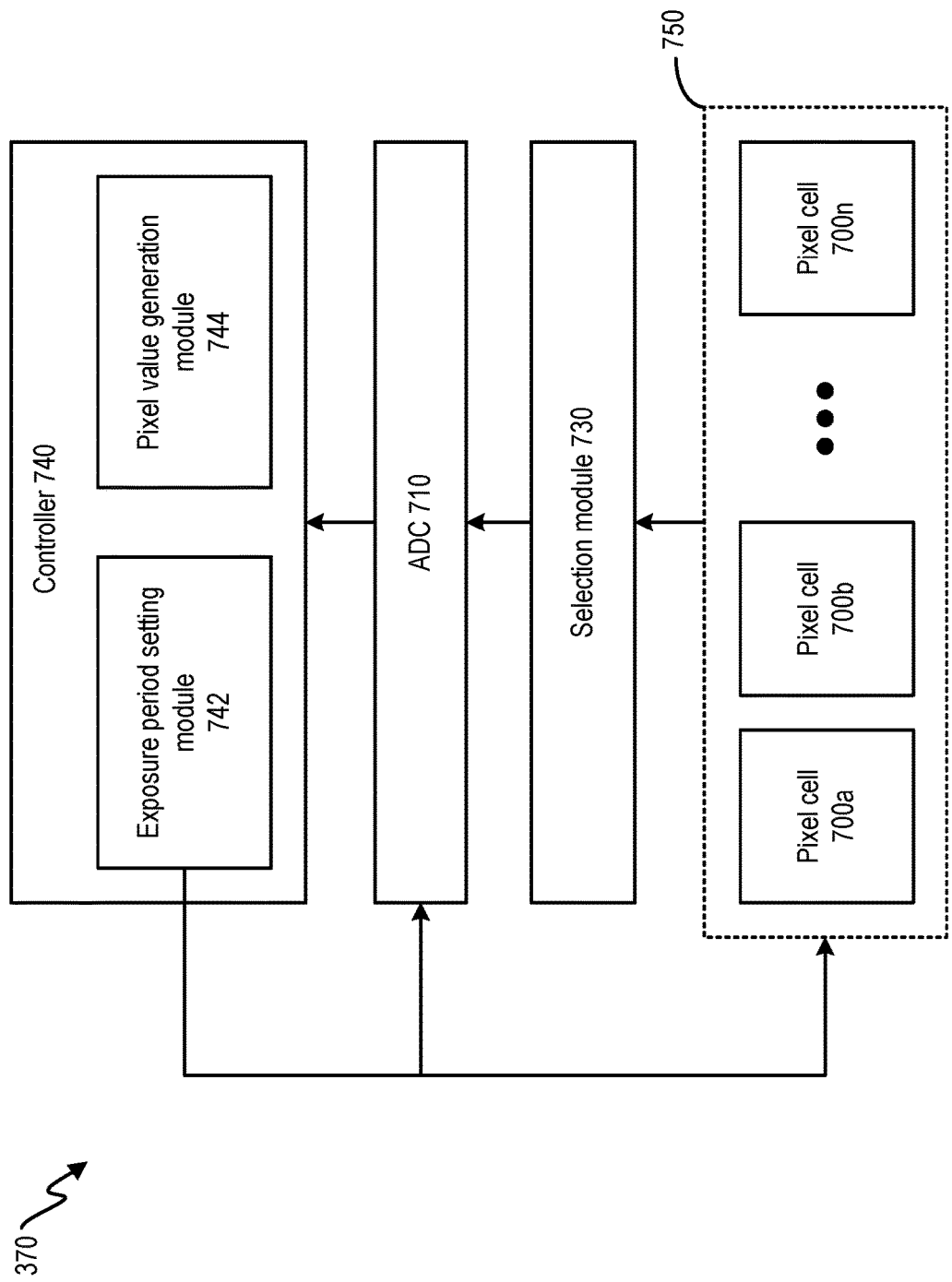
FIGS. 7A and 7B illustrate block diagrams of embodiments of an image sensor.

FIG. 7A illustrates an example of image sensor 370 which includes one or more pixel cells 700 (e.g., pixel cells 700a, 700b, ... 700n), an ADC 710, a selection module 730, and a controller 740. Pixel cell 700 may be part of a pixel array 750, and each pixel cell can generate an output (e.g., a voltage output based on the accumulated charges) to represent an intensity of light upon the pixel cell. Selection module 730 can be configured to route the outputs to ADC 710 to generate digital pixel values based on the outputs, to enable the pixel cells to time-share ADC 710. For example, selection module 730 may be configured to route the outputs to ADC 710 following a round-robin fashion (e.g., starting from pixel cell 700a, followed by pixel cell 700b, etc.) to enable ADC 710 to process the output of each pixel cell 700 in the pixel cell array. As another example, ADC 710 may include a plurality of ADCs 710, each of which corresponds to a pixel cell 700, and selection module 730 can be controlled to forward (or not to forward) the output of a pixel cell 700 to the corresponding ADC 710. In such an example, selection module 730 and ADC 710 can be part of each of pixel cell 700.

ADC 710 may generate a digital representation of the outputs of the pixel cells. In some examples, as to be discussed in more details below, in a first phase of measurement ADC 710 may generate a digital representation of a time duration for the quantity of charges accumulated in the capacitor to reach a pre-determined threshold. The first phase of measurement can be performed during the exposure period. The pre-determined threshold can be based on a certain percentage of the saturation capacity of the capacitors of the one or more pre-determined pixel cells. In the first phase of measurement, ADC 710 may generate an onset of saturation indication based on the quantity of charges accumulated in the capacitor reaching the pre-determined threshold for those pre-determined pixel cells, and transmit the indication to controller 740. Moreover, ADC 710 can also perform a second phase and a third phase of measurement, in which ADC 710 can generate a digital representation of the quantity of charges accumulated in the capacitor of a pixel cell. The second phase of measurement can occur after the first measurement phase during the exposure period and the third phase can occur after the exposure period ends. ADC 710 can perform multi-stage processing of the output from the pixel cell by, for example, performing the first phase of measurement to detect onset of saturation during the exposure period, followed by the second phase and third phase of measurement. If the onset of saturation is detected, ADC 710 may transmit the onset of saturation indication to controller 740. ADC 710 may also transmit the digital representations (generated in the first measurement phase or the second measurement phase) to controller 740 for further processing.

Controller 740 may include an exposure period setting module 742 and a pixel value generation module 744. Exposure period setting module 742 may monitor for the onset of saturation indication from ADC 710 for a set of pre-determined pixel cells and, upon receiving the indication, stops the exposure period for all of pixel cells 700 of the pixel array 750. The end of the exposure period also stops the first phase of measurement and the second phase of measurement at ADC 710. Moreover, in some examples, controller 740 can skip the third phase of measurement in response to receiving the onset of saturation indication. On the other hand, if no onset of saturation indication is received from ADC 710, exposure period setting module 742 may adopt a pre-set default end time for the exposure period and ends the exposure period when the default end time arrives, and may perform, for example, the first phase of measurement, the second phase of measurement, and the third phase of measurement. The pre-set default end time can be determined based on various factors including, for example, the capacity of the capacitor at pixel cell 700, an average ambient light intensity in the environment, the rate of charge generation of the photodiode for the average ambient light intensity, a rate of motion of the device (e.g., a HMD) that houses image sensor 370, etc. For example, in a case where the device is undergoing a rapid motion, the default exposure period can be reduced to minimize motion blur in the image. The pre-set default end time can be configured such that when the photodiode is exposed to the ambient light in an exposure period, sufficient spare capacity (e.g., 50%) remains at the capacitor when the exposure period ends at the pre-set default end time.

Moreover, pixel value generation module 744 can also control a second set of pixel cells not selected for onset of saturation detection to perform, for example, the second phase of measurement and the third phase of measurement within the same exposure period to obtain the digital representations of pixel values. Pixel value generation module 744 may obtain, from ADC 710, intermediate pixel values provided by the second set of pixel cells and perform post-processing based on the onset of saturation detection from the pre-determined pixel cells. For example, in a case where onset of saturation is detected, pixel value generation module 744 can determine a scaling value based on a ratio of the default exposure time to the adjusted exposure time (adjusted due to onset of saturation indication), and normalize the intermediate pixel values obtained from each pixel cell based on the scaling value. The normalization can be used to, for example, deemphasize the image of the certain regions (e.g., regions with the highest light intensity) relative to the rest of the scene (which is likely to include more image details), to enable an image processor to extract the image details of the rest of the scene for other applications (e.g., a location tracking application) that rely on those details.

As discussed above, ADC 710 may detect the onset of saturation indication for a set of pre-determined pixel cells, which enables exposure period setting module 742 to set the end of exposure period for the rest of the pixel cells of pixel cell array 750. There are different ways by which the set of pixel cells can be selected for onset of saturation detection by ADC 710. For example, pixel cell array 750 can be divided into multiple blocks of pixel cells, and one or more pixel cells can be selected from each block of pixel cells for onset of saturation detection. In some examples, selection module 730 can be configured to route the output of the same pixel cell(s) to ADC 710 for onset of saturation detection at the beginning of each exposure period. The pixel cell can be selected based on, for example, a location of the pixel cell within the pixel cell array (e.g., at the center of each block) which makes it more likely that, for example, the intensity of light received by that pixel cell represents the block's average light intensity level. In some examples, selection module 730 can also be configured to route the output of different pixel cell(s) to ADC 710 for onset of saturation detection at the beginning of different exposure periods. For example, due to the movement of the light source and/or image sensor 370, the pixel cells that exhibit onset of saturation may change with time, which can be tracked by controller 740. For example, controller 740 may instruct selection module 730 to route the output of a pixel cell to ADC 710 for onset of saturation detection for a current exposure period based on that pixel cell exhibiting onset of saturation in the previous exposure period. If that pixel cell no longer exhibits onset of saturation in the current exposure period, controller 740 may instruct selection module 730 not to route the output of that pixel cell to ADC 710 for onset of saturation detection for a subsequent exposure period. In some examples, controller 740 may also apply a random function to determine the pixel cell for onset of saturation detection, such that the pixel cell selection can be randomized. All these techniques can be adapted to, for example, reduce the likelihood that controller 740 fails to detect onset of saturation in other pixel cells not selected for the detection and does not adjust the exposure period accordingly.

In some examples, as described above, each pixel cell 700 of image sensor 370 may also include an ADC 710, and selection module 730 can be omitted (or configured to forward or not to forward pixel cell output to ADC 710). In such a case, each pixel cell 700 can stop exposure once the default exposure time ends. Moreover, a pre-determined set of pixel cells 700 (e.g., selected based on the techniques described above) can perform a first phase of measurement using its local ADC 710 to generate the onset of saturation indication, and transmit the indications to exposure period setting module 742. Exposure period setting module 742 can stop the exposure period for each pixel cell 700 upon detecting the earliest onset of saturation indication(s) from the pixel cells. On the other hand, other pixel cells 700 that are in the pre-determined set may be controlled to perform, for example, the second phase and third phase of measurements to generate digital pixel values representing that incident light intensity at those pixel cells received during either the default exposure period or the adjusted exposure period.

Figure 7B:
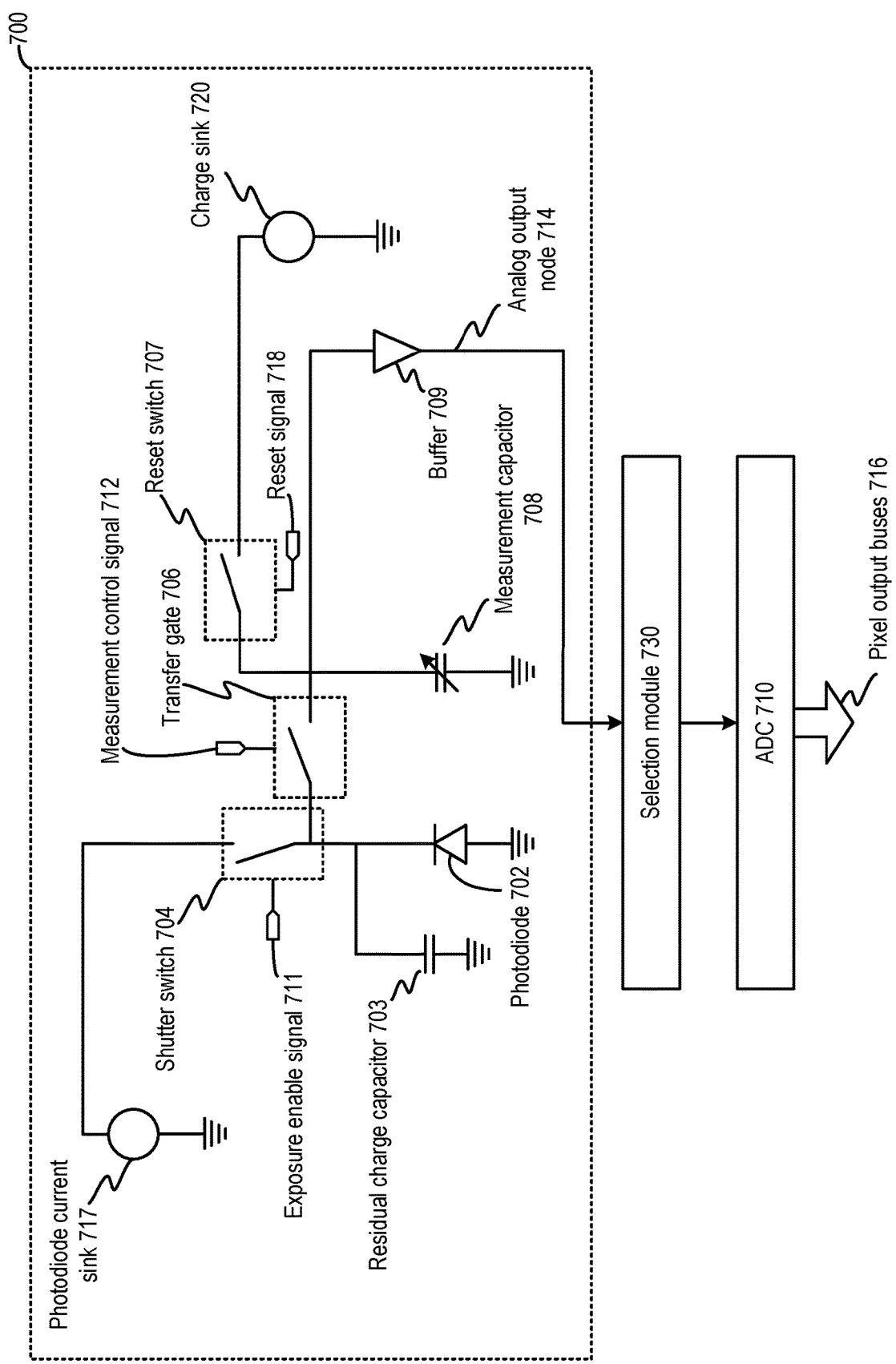

FIG. 7B illustrates an example of a pixel cell 700. As shown in FIG. 7B, pixel cell 700 may include a photodiode 702, a residual charge capacitor 703, a shutter switch 704, a transfer gate 706, a reset switch 707, a measurement capacitor 708, a buffer 709, and a ADC 710.

In some embodiments, photodiode 702 may include a P-N diode or a P-I-N diode. Each of shutter switch 704, transfer gate 706, and reset switch 707 can include a transistor. The transistor may include, for example, a metal-oxide-semiconductor field-effect transistor (MOSFET), a bipolar junction transistor (BJT), etc. Shutter switch 704 can act as an electronic shutter gate (in lieu of, or in combination with, mechanical shutter 404 of FIG. 4) to control an exposure period of pixel cell 700. During the exposure period, shutter switch 704 can be disabled (turned off) by exposure enable signal 711, whereas transfer gate 706 can be enabled (turned on) by measurement control signal 712, which allows charges generated by photodiode 702 to move to residual charge capacitor 703 and/or measurement capacitor 708. At the end of the exposure period, shutter switch 704 can be enabled to steer the charges generated by photodiode 702 into photodiode current sink 717. Moreover, reset switch 707 can also be disabled (turned off) by reset signal 718, which allows measurement capacitor 708 to accumulate the charges and develop a voltage that reflects a quantity of the accumulated charges. The voltage can be buffered by buffer 709, and the output of buffer 709 (at analog output node 714) can be provided to selection module 730, which can route the output to ADC 710 for processing. After a phase of measurement completes, reset switch 707 can be enabled to empty the charges stored at measurement capacitor 708 to charge sink 720, to make measurement capacitor 708 available for the next measurement. Exposure period setting module 742 can control the exposure period and the quantity of charges stored at residual charge capacitor 703 and measurement capacitor 708 by, for example, controlling the timing of shutter switch 704, measurement control signal 712, and reset signal 718.

Residual charge capacitor 703 can be a device capacitor of photodiode 702 and can store charges generated by photodiode 702. Residual charge capacitor 703 can include, for example, a junction capacitor at the P-N diode junction interface, or other device capacitor(s) connected to photodiode 702. Due to the proximity of residual charge capacitor 703 to photodiode 702, charges generated by photodiode 702 may be accumulated at charge capacitor 703. Measurement capacitor 708 can be a device capacitor at a floating terminal of transfer gate 706, a metal capacitor, a MOS capacitor, or any combination thereof. Measurement capacitor 708 can be used to store a quantity of charges, which can be measured by ADC 710 to provide a digital output representing the incident light intensity. The charges stored at measurement capacitor 708 can be either overflow charges (from photodiode 702) that are not to be accumulated at residual charge capacitor 703, or residual charges that are emptied from residual charge capacitor 703.

Figure 8:
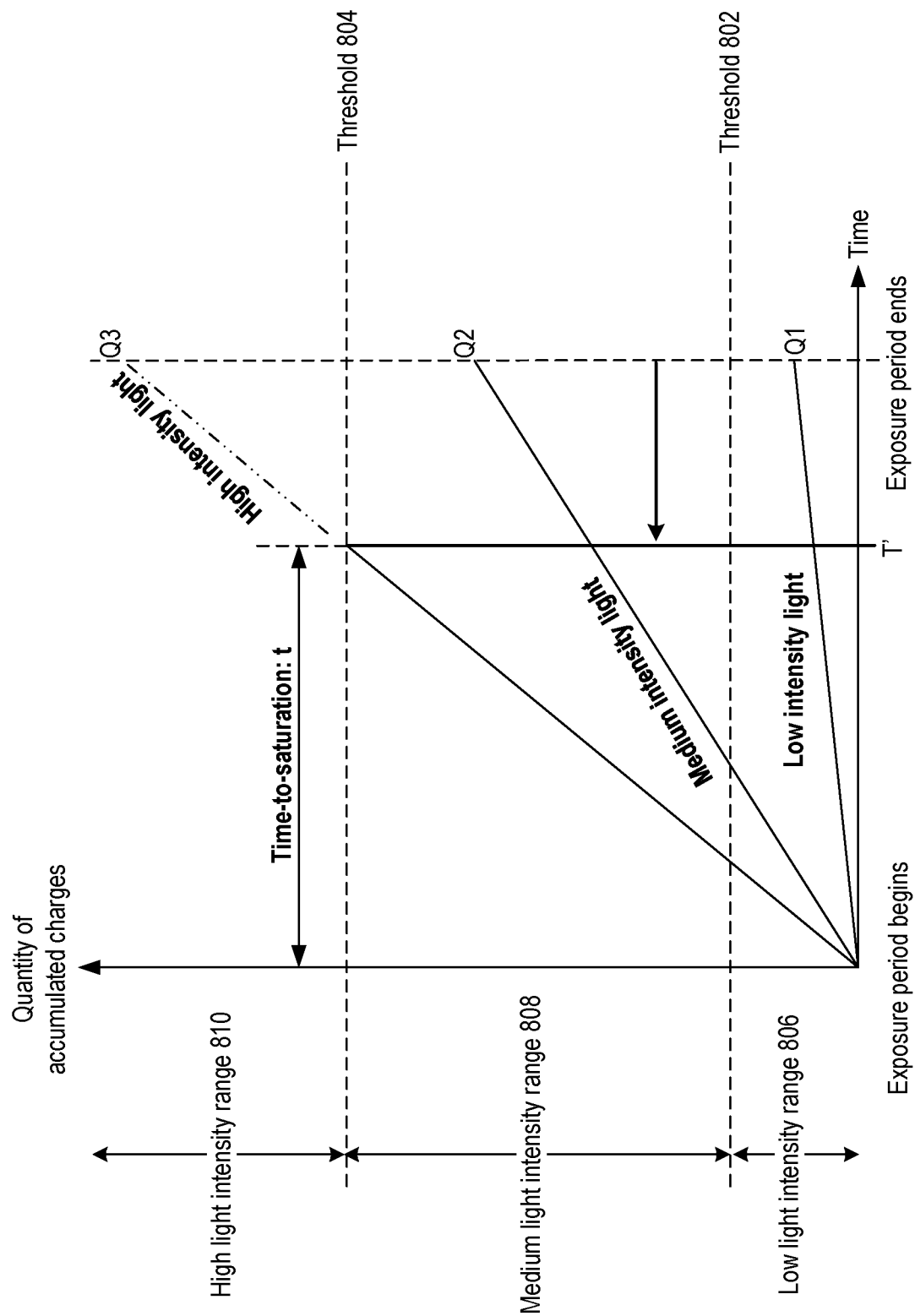
FIG. 8 illustrates operations for determining light intensities of different ranges by embodiments of FIGS. 7A and 7B.

Reference is now made to FIG. 8, which illustrates the charge accumulation operations at residual charge capacitor 703 and measurement capacitor 708 for different target light intensity ranges. FIG. 8 illustrates a total quantity of charges accumulated (or expected to accumulate) at residual charge capacitor 703 and measurement capacitor 708 with respect to time for different light intensity ranges. The total quantity of charges accumulated can reflect the total charges generated by photodiode 702 during an exposure period, which in turns reflects the intensity of light incident upon photodiode 702 during the exposure period. The quantity can be measured when the exposure period ends. A threshold 802 and a threshold 804 can be defined for thresholds quantity of charges defining a low light intensity range 806, a medium light intensity range 808, and a high light intensity range 810 for the intensity of the incident light. For example, if the total accumulated charges is below threshold 802 (e.g., Q1), the incident light intensity is within low light intensity range 806. If the total accumulated charges is between threshold 804 and threshold 802 (e.g., Q2), the incident light intensity is within medium light intensity range 808. If the total accumulated charges is above threshold 804, the incident light intensity is within high light intensity range 810.

Thresholds 802 and 804 can be set to control the accumulation of charges at residual charge capacitor 703 and measurement capacitor 708, to ensure that the quantity of accumulated charges at the capacitors correlates with the incident light intensity when the incident light intensity falls within either low light intensity range 806 or medium light intensity range 808. For example, thresholds 802 and 804 can be set below the capacities of residual charge capacitor 703 and measurement capacitor 708. As discussed above, once residual charge capacitor 703 and measurement capacitor 708 reaches full capacity, the capacitors may start leaking charges, and the voltage developed at the capacitors may not accurately represent or reflect the total number of charges generated by photodiode 702 during the exposure period. By setting thresholds 802 and 804 to below the capacities of residual charge capacitor 703 and measurement capacitor 708, measurement error caused by charge leakage can be avoided. In some examples, threshold 802 can be set at 2000e− (2000 charges), whereas threshold 804 can be set at 63000e− (63000 charges).

The accumulation of charges at residual charge capacitor 703 and measurement capacitor 708 can be controlled by thresholds 802 and 804. For example, an incident light intensity falling within low light intensity range 806 can be based on the total charges accumulated at residual charge capacitor 703. Assuming residual charge capacitor 703 is not yet full at the end of the exposure period, the total charges accumulated at residual charge capacitor 703 can reflect the total charges generated by photodiode 702 during the exposure period, and can be used to determine the incident light intensity. When the total charges accumulated at residual charge capacitor 703 exceeds threshold 802, the additional charges generated by photodiode 702 can be diverted to measurement capacitor 608 as overflow charges. Assuming measurement capacitor 708 is not yet full at the end of the exposure period, the total overflow charges accumulated at measurement capacitor 708 can also reflect the total charges generated by photodiode 702 during the exposure period, and can be used to determine the incident light intensity (which falls within medium light intensity range 808).

On the other hand, in a case where the incident light intensity is within high light intensity range 810, the total overflow charges accumulated at measurement capacitor 708 may exceed threshold 804 before the exposure period ends. As additional charges are accumulated, measurement capacitor 708 may reach full capacity before the end of the exposure period, and charge leakage may occur. To avoid measurement error caused due to measurement capacitor 708 reaching full capacity, a time-to-saturation measurement can be performed to measure the time duration it takes for the total overflow charges accumulated at measurement capacitor 708 to reach threshold 804. A rate of charge accumulation at measurement capacitor 708 can be determined based on a ratio between threshold 804 and the time-to-saturation, and a hypothetical quantity of charge (Q3) that could have been accumulated at measurement capacitor 708 at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 810. Moreover, with embodiments of the present disclosure, the exposure period can be adjusted to shift leftwards to time T' when the quantity of accumulated charges reaches threshold 804, to reduce the likelihood of saturating the pixel cell.

Referring back to FIG. 7B, transfer gate 706 can be controlled by measurement control signal 712 to control the charge accumulations at residual charge capacitor 703 and measurement capacitor 708 for different light intensity ranges as described above. For example, for low light intensity range 806, transfer gate 706 can be controlled to operate in a partially turned-on state. During the exposure period, the gate voltage of transfer gate 706 can set based on a voltage developed at residual charge capacitor 703 when the total accumulated charges at residual charge capacitor 703 reaches threshold 802. With such arrangements, the charges generated by photodiode 702 will be stored in residual charge capacitor 703 first until the quantity of accumulated charges reaches threshold 802. Right before the exposure period ends, transfer gate 706 can be controlled to operate in a fully turned-on state to move the charges stored in residual charge capacitor 703 to measurement capacitor 708. At the end of the charge transfer, transfer gate 706 can be controlled to operate in a fully turned-off state to preserve the charges stored in measurement capacitor 708. At that point, the charges stored in measurement capacitor 708 may represent the charges stored in residual charge capacitor 703, and can be used to determine the incident light intensity. On the other hand, for medium light intensity range 808 and high light intensity range 810, the overflow charges accumulated at measurement capacitor 708 can also be measured right before the exposure period ends, when the transfer gate 706 is still in a partially turned-on state and the charges stored in residual charge capacitor 703 are not yet transferred to measurement capacitor 708.

The charges accumulated at measurement capacitor 708 can be sensed by buffer 709 to generate a replica of the analog voltage (but with larger driving strength) at analog output node 714. The analog voltage at analog output node 714 can be converted into a set of digital data (e.g., comprising logical ones and zeros) by ADC 710. The analog voltage developed at measurement capacitor 708 can be sampled and digital output can be generated before the end of the exposure period (e.g., for medium light intensity range 808 and high light intensity range 810), or after the exposure period (for low light intensity range 806). The digital data can be transmitted by a set of pixel output buses 716 to, for example, control circuitries 510 of FIG. 5, to represent the light intensity during the exposure period.

In some examples, the capacitance of measurement capacitor 708 can be configurable to improve the accuracy of light intensity determination for low light intensity ranges. For example, the capacitance of measurement capacitor 708 can be reduced when measurement capacitor 708 is used to measure the residual charges stored at residual charge capacitor 703. The reduction in the capacitance of measurement capacitor 708 can increase the charge-to-voltage conversion ratio at measurement capacitor 708, such that a higher voltage can be developed for a certain quantity of stored charges. The higher charge-to-voltage conversion ratio can reduce the effect of measurement errors (e.g., quantization error, comparator offset, noise associated with the buffer circuit, etc.) introduced by ADC 710 on the accuracy of low light intensity determination. The measurement error can set a limit on a minimum voltage difference that can be detected and/or differentiated by ADC 710. By increasing the charge-to-voltage conversion ratio, the quantity of charges corresponding to the minimum voltage difference can be reduced, which in turn reduces the lower limit of a measurable light intensity by pixel cell 700 and extends the dynamic range. On the other hand, for medium light intensity, the capacitance of measurement capacitor 708 can be increased to ensure that the measurement capacitor 708 has sufficient capacity to store a quantity of charges up to, for example, the quantity defined by threshold 804.

Figure 9:
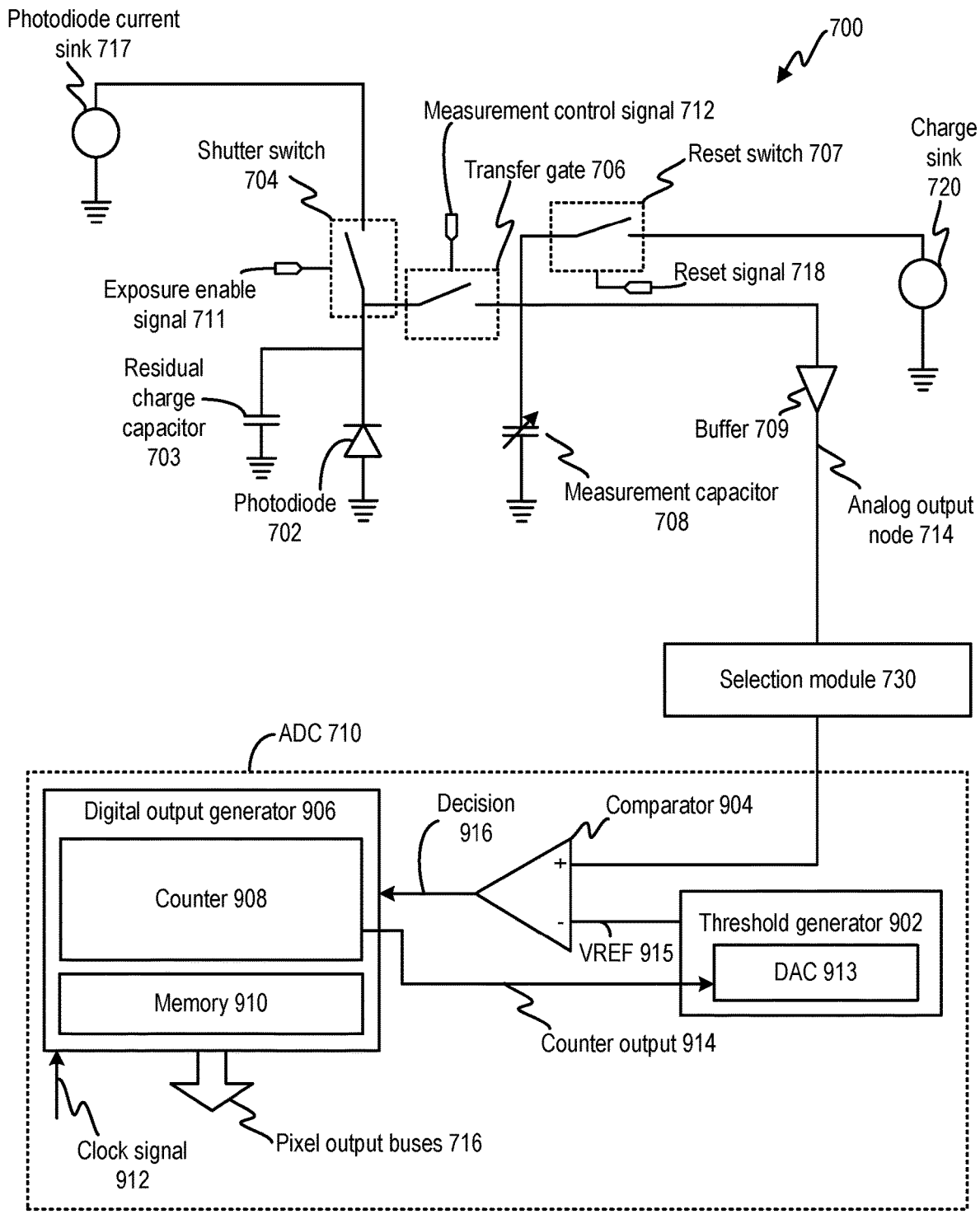
FIG. 9 illustrates examples of internal components of the pixel cell of FIG. 7.

FIG. 9 illustrates an example of the internal components of ADC 710. As shown in FIG. 9, ADC 710 includes a threshold generator 902, a comparator 904, and a digital output generator 906. Digital output generator 906 may further include a counter 908 and a memory 910. Counter 908 can generate a set of count values based on a free-running clock signal 912, whereas memory 910 can store at least some of the count values (e.g., the latest count value) generated by counter 908. In some embodiments, memory 910 may be part of counter 908. Memory 910 can be, for example, a latch circuit to store the counter value based on local pixel value as described below. Threshold generator 902 includes a digital-to-analog converter (DAC) 913 which can accept a set of digital values and output a reference voltage (VREF) 915 representing the set of digital values. As to be discussed in more detail below, threshold generator 902 may accept static digital values to generate a fixed threshold, or accept output 914 of counter 908 to generate a ramping threshold.

Although FIG. 9 illustrates that DAC 913 (and threshold generator 902) is part of ADC 710, it is understood that DAC 913 (and threshold generator 802) can be coupled with multiple digital output generators 906 from different pixel cells. Moreover, digital output generator 906 (and ADC 710) can also be shared among a plurality of multiple pixel cells to generate the digital values.

Comparator 904 can compare the analog voltage developed at analog output node 714 against the threshold provided by threshold generator 902, and generate a decision 916 based on the comparison result. For example, comparator 904 can generate a logical one for decision 916 if the analog voltage at analog output node 714 equals to or exceeds the threshold generated by threshold generator 902. Comparator 904 can also generate a logical zero for decision 916 if the analog voltage falls below the threshold. Decision 916 can control the counting operations of counter 908 and/or the count values stored in memory 910, to perform the aforementioned time-of-saturation measurement of a ramping analog voltage at analog output node 714 as well as quantization processing of the analog voltage at analog output node 714 for incident light intensity determination.

Figure 10B:
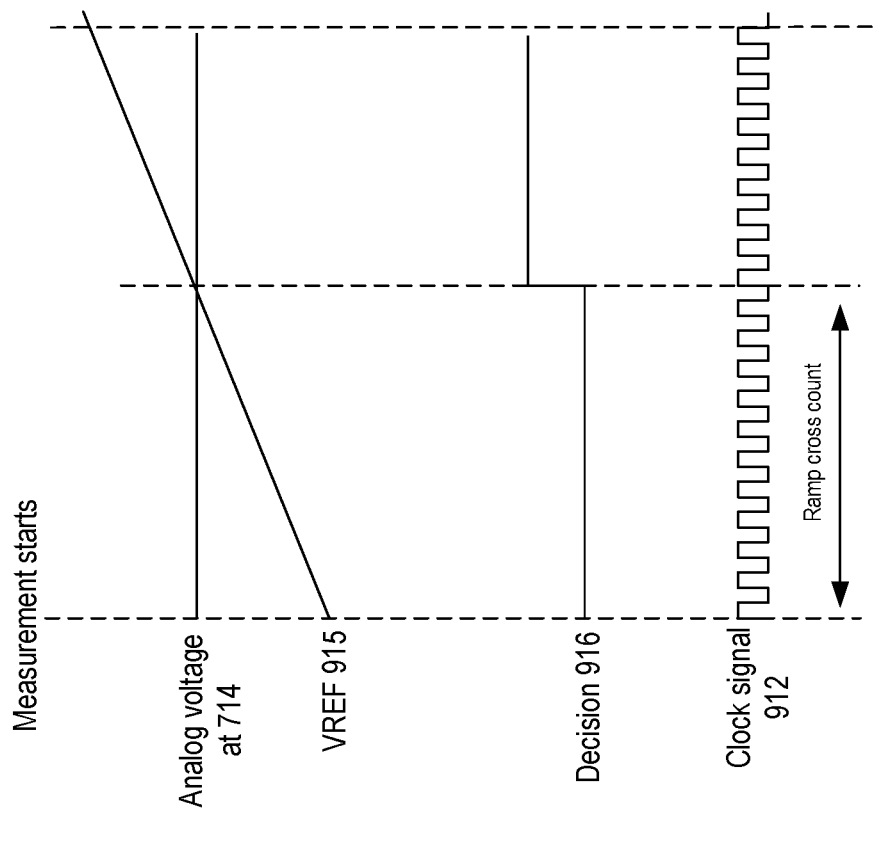
FIGS. 10A, 10B, 10C, and 10D illustrate techniques for quantizing a light intensity.
Figure 10A:
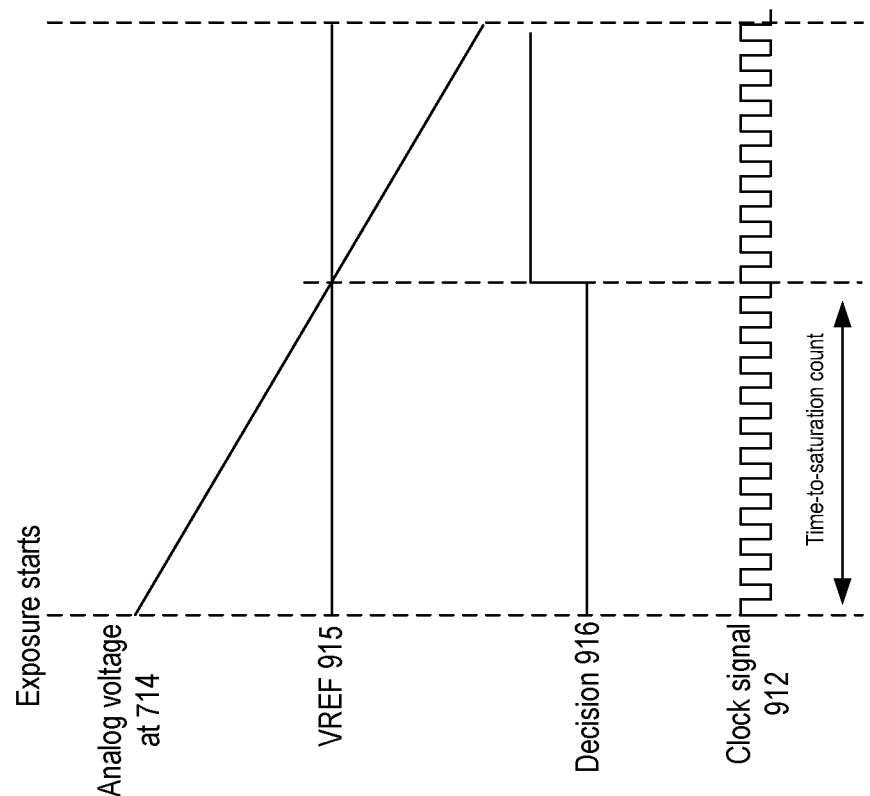

FIG. 10A illustrates an example of time-to-saturation measurement by ADC 710. To perform the time-to-saturation measurement, threshold generator 802 can control DAC 813 to generate a fixed VREF 915. Fixed VREF 915 can be set at a voltage corresponding to a charge quantity threshold between the medium light intensity range and the high light intensity range (e.g., threshold 804 of FIG. 8). Counter 908 can start counting right after the exposure period starts (e.g., right after shutter switch 704 is disabled). As the analog voltage at analog output node 714 ramps down (or up depending on the implementation), clock signal 912 keeps toggling to update the count value at counter 908. The analog voltage may reach the fixed threshold at a certain time point, which causes decision 916 by comparator 904 to flip. The flipping of decision 916 may stop the counting of counter 908, and the count value at counter 908 may represent the time-to-saturation, with a smaller count value indicating a higher rate of charge accumulation and a higher light intensity. Decision 916 of FIG. 10A can also be used to provide an indication of onset of saturation, in a case where the voltage at analog output node 714 is compared against a pre-determined threshold representing a fraction of the saturation limit.

FIG. 10B illustrates an example of quantizing an analog voltage by ADC 710. After measurement starts, DAC 913 may be programmed by counter output 914 to generate a ramping VREF 915, which can either ramp up (in the example of FIG. 10B) or ramp down depending on implementation. In the example of FIG. 10B, the quantization process can be performed with uniform quantization steps, with VREF 915 increasing (or decreasing) by the same amount for each clock cycle of clock signal 912. The amount of increase (or decrease) of VREF 915 corresponds to a quantization step. When VREF 915 reaches within one quantization step of the analog voltage at analog output node 714, decision 916 by comparator 904 flips. The flipping of decision 916 may stop the counting of counter 908, and the count value can correspond to a total number of quantization steps accumulated to match, within one quantization step, the analog voltage. The count value can become a digital representation of the quantity of charges stored at measurement capacitor 708, as well as the digital representation of the incident light intensity. As discussed above, the quantization of the analog voltage can occur during the exposure period (e.g., for medium light intensity range 808) and after the exposure period (e.g., for low light intensity range 806).

Figures 10C, 10D:
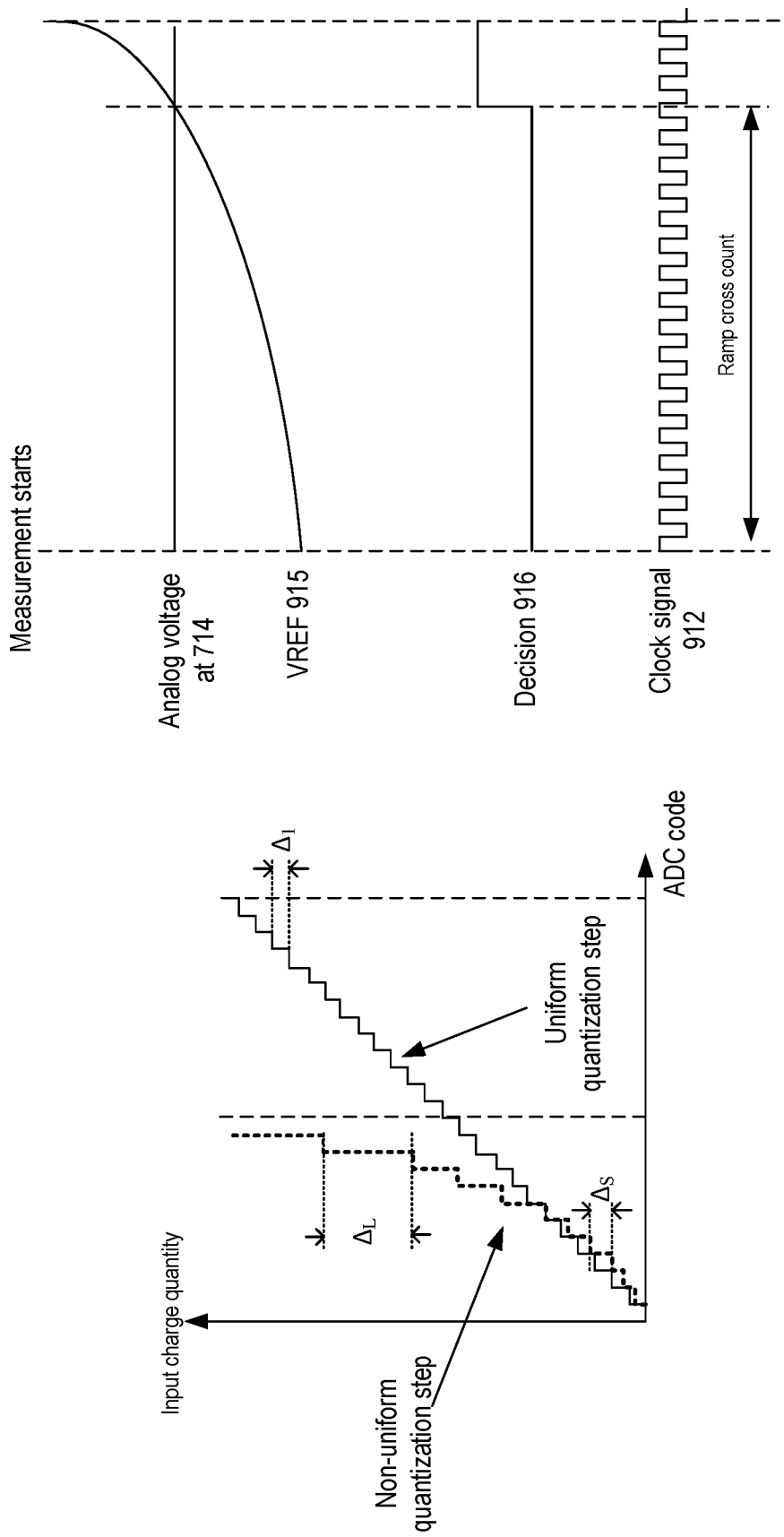

As discussed above, ADC 710 can introduce quantization errors when there is a mismatch between a quantity of charges represented by the quantity level output by ADC 710 (e.g., represented by the total number of quantization steps) and the actual input quantity of charges that is mapped to the quantity level by ADC 710. One way to reduce quantization error can be by employing a non-uniform quantization scheme, in which the quantization steps are not uniform across the input range. FIG. 10C illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 710 can be reduced. Therefore, the reduced quantization errors can push down the lower limit of the measurable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charges can be reduced. On the other hand, the total number of quantization steps covering the entire range of input charge quantities may remain the same (or even reduced), and the aforementioned potential problems associated with increasing the number of quantization steps (e.g., increase in area, higher bandwidth requirement, reduction in processing speed, etc.) can be avoided.

FIG. 10D illustrates an example of quantizing an analog voltage by ADC 710 using a non-uniform quantization process. Compared with FIG. 10B (which employs a uniform quantization process), VREF 915 increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF 915 increases at a slower rate. For higher counter count values (which correspond to a higher input quantity range), the quantization steps are made larger, hence VREF 915 increases at a higher rate. The uneven quantization steps in VREF 915 can be introduced using different schemes. For example, as discussed above, DAC 913 is configured to output voltages for different counter count values (from counter 908). DAC 913 can be configured such that the difference in the output voltage between two neighboring counter count values (which defines the quantization step size) is different for different counter count values. As another example, counter 908 can also be configured to generate jumps in the counter count values, instead of increasing or decreasing by the same count step, to generate the uneven quantization steps. In some examples, the non-uniform quantization process of FIG. 10D can be employed for light intensity determination for low light intensity range 806 and medium light intensity range 808.

Figure 11:
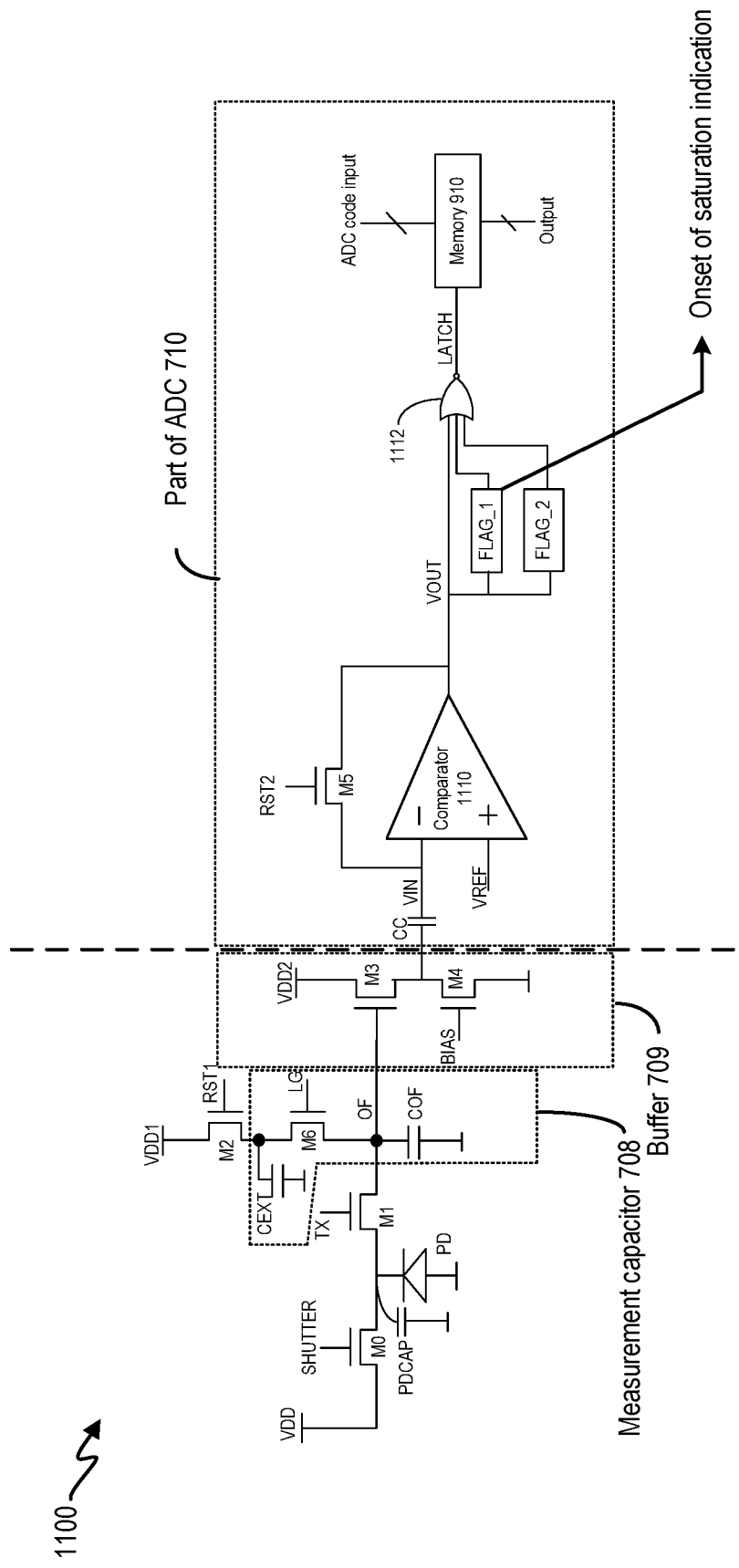
FIG. 11 illustrates block diagrams of an embodiment of a pixel cell.

Reference is now made to FIG. 11, which illustrates an example of pixel cell 1100, which can be an embodiment of pixel cell 700 of FIG. 7. In the example of FIG. 11, PD can correspond to photodiode 702, transistor M0 can correspond to shutter switch 704, transistor M1 can correspond to transfer gate 706, whereas transistor M2 can correspond to reset switch 707. Moreover, PDCAP can correspond to residual charge capacitor 703, whereas a combination of COF and CEXT capacitors can correspond to measurement capacitor 708. The capacitance of measurement capacitor 708 is configurable by the signal LG. When LG is enabled, measurement capacitor 708 provides combined capacities of COF and CEXT capacitors. When LG is disabled, CEXT capacitor can be disconnected from the parallel combination, and measurement capacitor 708 comprises only COF capacitor (plus other parasitic capacitances). As discussed above, the capacitance of measurement capacitor 708 can be reduced to increase the charge-to-voltage conversion ratio for the low light intensity determination, and can be increased to provide the requisite capacity for the medium light intensity determination.

Pixel cell 1100 further includes an example of buffer 709 coupled with an example of ADC 710 via a selection module (not shown in FIG. 11). For example, transistors M3 and M4 form a source follower which can be buffer 709 of FIG. 7B to buffer an analog voltage developed at the OF node, which represents a quantity of charges stored at the COF capacitor (or at the COF and CEXT capacitors). Further, the CC cap, comparator 1110, transistor M5, NOR gate 1112, together with memory 910, can be part of ADC 710 to generate a digital output representing the analog voltage at the OF node. As described above, the quantization can be based on a comparison result (VOUT), generated by comparator 1110, between the analog voltage developed at the OF node and VREF. Here, the CC cap is configured to generate a VIN voltage (at one input of comparator 1110) which tracks the output of buffer 709, and provides the VIN voltage to comparator 1110 to compare against VREF. VREF can be a static voltage for time-of-saturation measurement (for high light intensity range) or a ramping voltage for quantization of an analog voltage (for low and medium light intensity ranges). The ADC code input can be generated by a free-running counter (e.g., counter 908), and the comparison result generated by comparator 1110 can determine the ADC code input to be stored in memory 910 and to be output as the digital representation of the incident light intensity. In some examples, the generation of VREF for low and medium light intensity determination can be based on a non-uniform quantization scheme as discussed in FIG. 10C and FIG. 10D.

Pixel cell 1100 includes techniques that can further improve the accuracy of the incident light intensity determination, in addition to the techniques disclosed above. For example, the combination of the CC cap and transistor M5 can be used to compensate for measurement errors (e.g., comparator offset and various noise) introduced by comparator 1110, as well as other error signals that are introduced to comparator 1110, such that the accuracy of comparator 1110 can be improved. The noise signals may include, for example, reset noise charges introduced by reset switch 707, a noise signal at the output of buffer 709 due to source follower threshold mismatches, etc. A quantity of charges reflecting the comparator offset as well as the error signals can be stored at the CC cap during a reset phase, when both transistors M2 and M5 are enabled. A voltage difference can also be developed across the CC cap during the reset phase due to the stored charges. During a measurement phase, the voltage difference across the CC cap remains, and the CC cap can track the output voltage of buffer 709 by subtracting away (or adding) the voltage difference to generate VIN. As a result, the VIN voltage can be compensated for the measurement errors and the error signals, which improves the accuracy of the comparison between VIN and VREF and the ensuing quantization.

In some examples, pixel cell 1100 can be operated in either a three-phase measurement process or a two-phase measurement process. The three-phase measurement process can be used for identifying textures or other image features of a physical object, such as hand 642. Each of the three phases can correspond to one of the three light intensity ranges of FIG. 8 (e.g., low light intensity range 806, medium light intensity range 808, and high light intensity range 810). On the other hand, the two-phase measurement process can be used for identifying an image of an object or an event generated from light of low light intensity range 806 and light of high light intensity range 810, but not from light of medium light intensity range 808. The two-phase measurement process can be used for, for example, detection of pixel data corresponding to glint patch 632 (which are likely in high light intensity range 810) and pixel data corresponding to pupil 634 (which are likely in low light intensity range 806), detection of dot patterns of infra-red lights (which are likely in high light intensity range 810), etc. By skipping one phase of measurement, the total duration of the measurement process can be reduced, which allows both power consumption and output latency to be reduced. Moreover, by using a set of bits to represent the low light intensity range 806 instead of a combined (and larger) range including low light intensity range 806 and medium light intensity range 808, the quantization error can be reduced, and the accuracy of detecting objects of low light intensity (e.g., pupil 634) can be improved as a result.

In each phase of the three-phase or two-phase measurement processes, pixel cell 1100 can be operated in a measurement phase targeted for the corresponding light intensity range, and determine whether the incident light intensity falls within the corresponding light intensity range based on the output of comparator 1110. If the incident light intensity falls within the corresponding light intensity range, pixel cell 1100 can latch the ADC code input (from counter 908) into memory 910, and put a lock (using a combination of the FLAG_1 and FLAG_2 signals) on memory 910 to prevent subsequent measurement phases from overwriting memory 910. At the end of the two-phase or three-phase measurement processes, the ADC code input stored in memory 910 can then be provided as the digital output representing the incident light intensity.

Figure 12A:
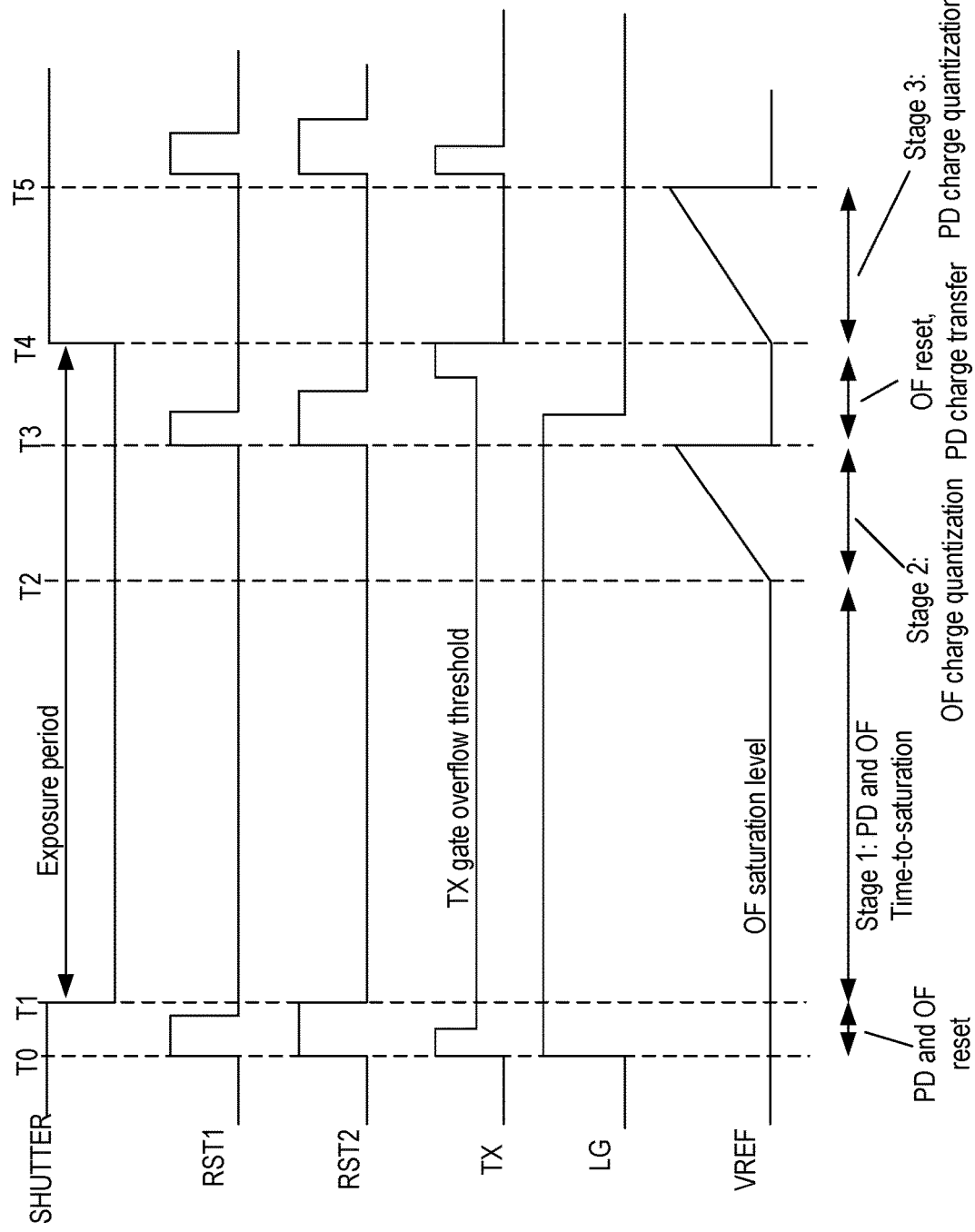

Reference is now made to FIGS. 12A-12D, which illustrate the change of the control signals of pixel cell 1100 for a three-phase measurement process with respect to time. Referring to FIG. 12A, the time period between T0 and T1 corresponds to a first reset phase, whereas the time period between T1 and T4 corresponds to the exposure period. Within the exposure period, the time period between T1 and T2 corresponds to a first phase of measurement for a high light intensity range (e.g., high light intensity range 810), the time period between T2 and T3 corresponds to a second phase of measurement for a medium light intensity range (e.g., medium light intensity range 808), whereas the time period between T3 and T4 corresponds to a second reset phase. Moreover, the time period between T4 and T5 corresponds to a third phase of measurement for a low light intensity range (e.g., low light intensity range 806). Pixel cell 1100 can provide the digital output representing the incident light intensity at time T5, and then start the next three-phase measurement process.

As shown in FIG. 12A, during the time period between T0 and T1 both RST1 and RST2 signals, as well as the LG signal, the TX signal, and the shutter signal, are asserted. As a result, the charges stored in the PDCAP capacitor, the CEXT capacitor, and the COF capacitor are removed. Moreover, no charges are added to the capacitors because the charges generated by photodiode PD are diverted away by transistor M0. Further, comparator 1110 is also in a reset phase, and the CC capacitor can store charges reflecting the reset noise introduced by M2, the comparator offset, the threshold mismatch of buffer 709, etc. Towards the end of the period, the TX gate is biased at a threshold level to trap a pre-determined number of charges (e.g., threshold 802) at PDCAP. The threshold level can be set based on a voltage corresponding to the pre-determined number of charges.

During the time period between T1 and T2, the shutter signal is de-asserted and the LG signal remains asserted, which allow the charges generated by the PD photodiode to flow into the PD capacitor and, if the voltage developed at the PD capacitor exceeds the threshold level set by TX, to flow into the COF capacitor and the CEXT capacitor. FIG. 12B illustrates the measurement operations performed by ADC 710 during that time period. As shown in FIG. 12B, ADC 710 can perform the time-to-saturation measurement, and the buffered and error-compensated version of analog voltage at the OF node (VIN) can be compared against a threshold voltage representing a quantity of charges of threshold 804 while counter 908 is free-running. If the total charges stored at the COF capacitor and the CEXT capacitor exceeds threshold 804 (based on the OF node voltage), comparator 1110 will trip, and the count value generated by counter 908 at the time of tripping can be stored into memory 910. The tripping of comparator 1110 also causes a register storing FLAG_1 to store a value of 1. The FLAG_1 signal can also be sent to controller 740 to represent an onset of saturation indication. The non-zero FLAG_1 value can cause the output of NOR gate 1112 to remain low regardless of other inputs to the NOR gate, and can lock the memory and prevent subsequent measurement phases from overwriting counter 908. On the other hand, if comparator 1110 never trips during the time period between T1 and T2, which indicates that the incident light intensity is below the high light intensity range, FLAG_1 stays zero. FLAG_2, which can be updated by subsequent measurement phases, stays at zero regardless of whether comparator 1110 trips.

During the time period between T2 and T3, which corresponds to the second phase of measurement, the analog voltage at the OF node can be quantized by ADC 710. FIG. 12C illustrates the measurement operations performed by ADC 710 during that time period. As shown in FIG. 12C, a ramping VREF can be supplied to comparator 1110 to be compared against the buffered and error-compensated version of analog voltage at the OF node (VIN). Although FIG. 12C shows a ramping VREF corresponding to a uniform quantization process, it is understood that the ramping VREF can also include non-uniform slopes corresponding to a non-uniform quantization process as described with respect to FIG. 10B. The second phase of measurement ends at T3, by which time the ADC input codes representing the entire medium incident light range have been cycled through. If the ramping VREF matches VIN (within one quantization step), comparator 1110 will trip, and the count value generated by counter 908 at the time of tripping can be stored into memory 910, if the memory is not locked by the first phase of measurement (as indicated by the zero value of FLAG_1). If the memory is locked, the count value will not be stored into memory 910. On the other hand, if the memory is not locked, the count value generated by counter 908 at the time of tripping can be stored into memory 910, and the memory can be locked by writing a value of 1 to a register storing FLAG_2.

At the beginning of the time period between T3 and T4, both RST1 and RST2 signals can be asserted again for a second reset phase. The purpose of the second reset phase is to reset the CEXT and COF capacitors, and to prepare the COF capacitor for storing charges transferred from the PDCAP capacitor in the third phase of measurement (for low light intensity range). The LG signal can also be de-asserted to disconnect the CEXT capacitor from the COF capacitor and to reduce the capacitance of measurement capacitor 708. The reduction of the capacitance is to increase the charge-to-voltage conversion ratio to improve the low light intensity determination, as discussed above. Comparator 1110 is also put into the reset state where the CC cap can be used to store the noise charges generated by the resetting of the CEXT and COF capacitors. Towards time T4, after the resetting completes, the RST1 and RST2 signals are de-asserted, whereas the bias TX can increase to fully turn on transistor M1. The charges stored in the PD cap can then move into the COF capacitor via M1. As discussed above, exposure period setting module 742 may set the exposure period by, for example, setting the timing of T4 based on receiving an asserted FLAG_1 signal which indicates the pixel cell is in the onset of saturation.

Figure 12D:
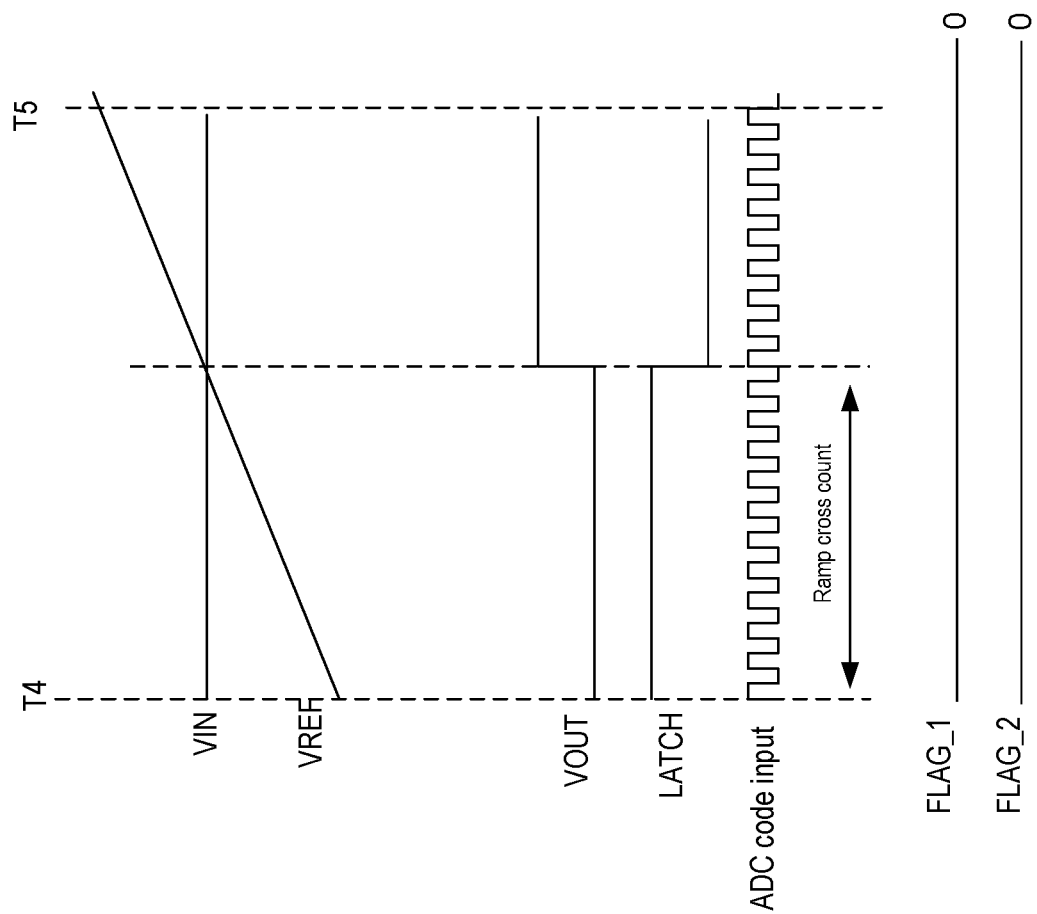

During the time period between T4 and T5, the third phase of measurement is performed for the low light intensity range. During that period, the shutter signal is asserted to end the exposure period, whereas the TX signal is de-asserted to disconnect the PDCA capacitor and the PD photodiode from the COF capacitor, to ensure that the COF capacitor, during the time of measurement, only stores the charges stored in the PDCAP capacitor during the exposure period. FIG. 12D illustrates the measurement operations performed by ADC 710 during that time period. As shown in FIG. 12D, a ramping VREF can be supplied to comparator 1110 to be compared against the buffered and error-compensated version of analog voltage at the OF node (VIN). Although FIG. 12D shows a ramping VREF corresponding to a uniform quantization process, it is understood that the ramping VREF can also include non-uniform slopes corresponding to a non-uniform quantization process as described with respect to FIG. 10D. The third phase of measurement ends at T5, by which time the ADC input codes representing the entire low incident light range have been cycled through. As shown in FIG. 12D, if the ramping VREF matches VIN (within one quantization step), comparator 1110 will trip, and the count value generated by counter 908 at the time of tripping can be stored into memory 910, if the memory is not locked by the first and second phases of measurement (as indicated by the zero values of FLAG_1 and FLAG_2). If the memory is locked, the count value will not be stored into memory 910. The count value stored in memory 910 can then be provided as a digital output representing the incident light intensity.

Figure 13:
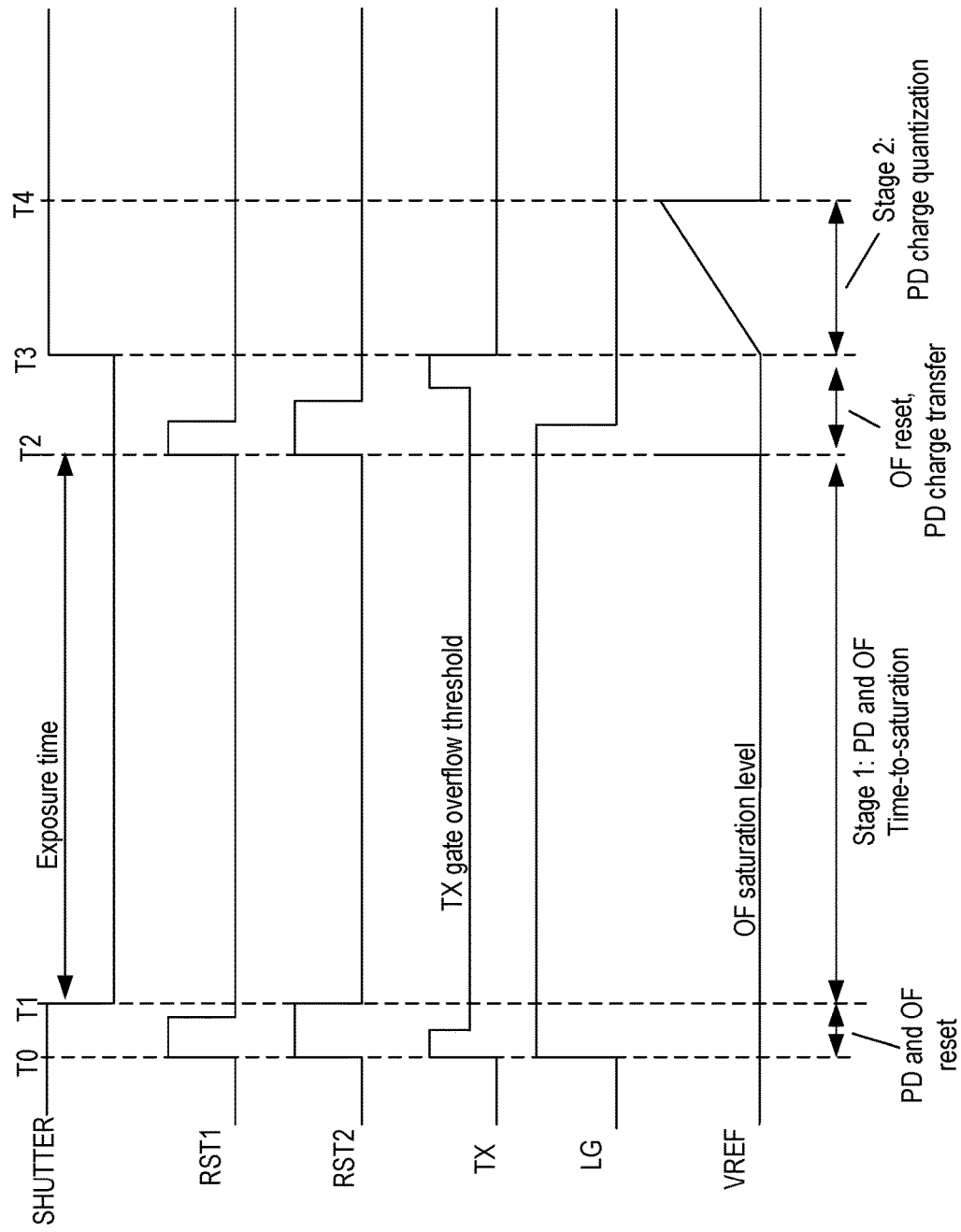
FIG. 13 illustrates another example methods for determining light intensity.

Reference is now made to FIG. 13, which illustrate the change of the control signals of pixel cell 1100 for a two-phase measurement process with respect to time. Referring to FIG. 13, the time period between T0 and T1 corresponds to a first reset phase, whereas the time period between T1 and T2 corresponds to the exposure period. Within the exposure period a first phase of measurement for a high light intensity range (e.g., high light intensity range 810) can be performed. Moreover, the time period between T2 and T3 corresponds to OF reset and PD charge transfer, whereas the time period between T3 and T4 corresponds to a second phase of measurement for a low light intensity range (e.g., low light intensity range 810), with the measurement phase for medium light intensity range skipped. The operations of pixel cell 1100 in each phase of measurement are similar to as discussed with respect to FIG. 12B and FIG. 12D, the detail of which are not repeated here.

Figure 14:
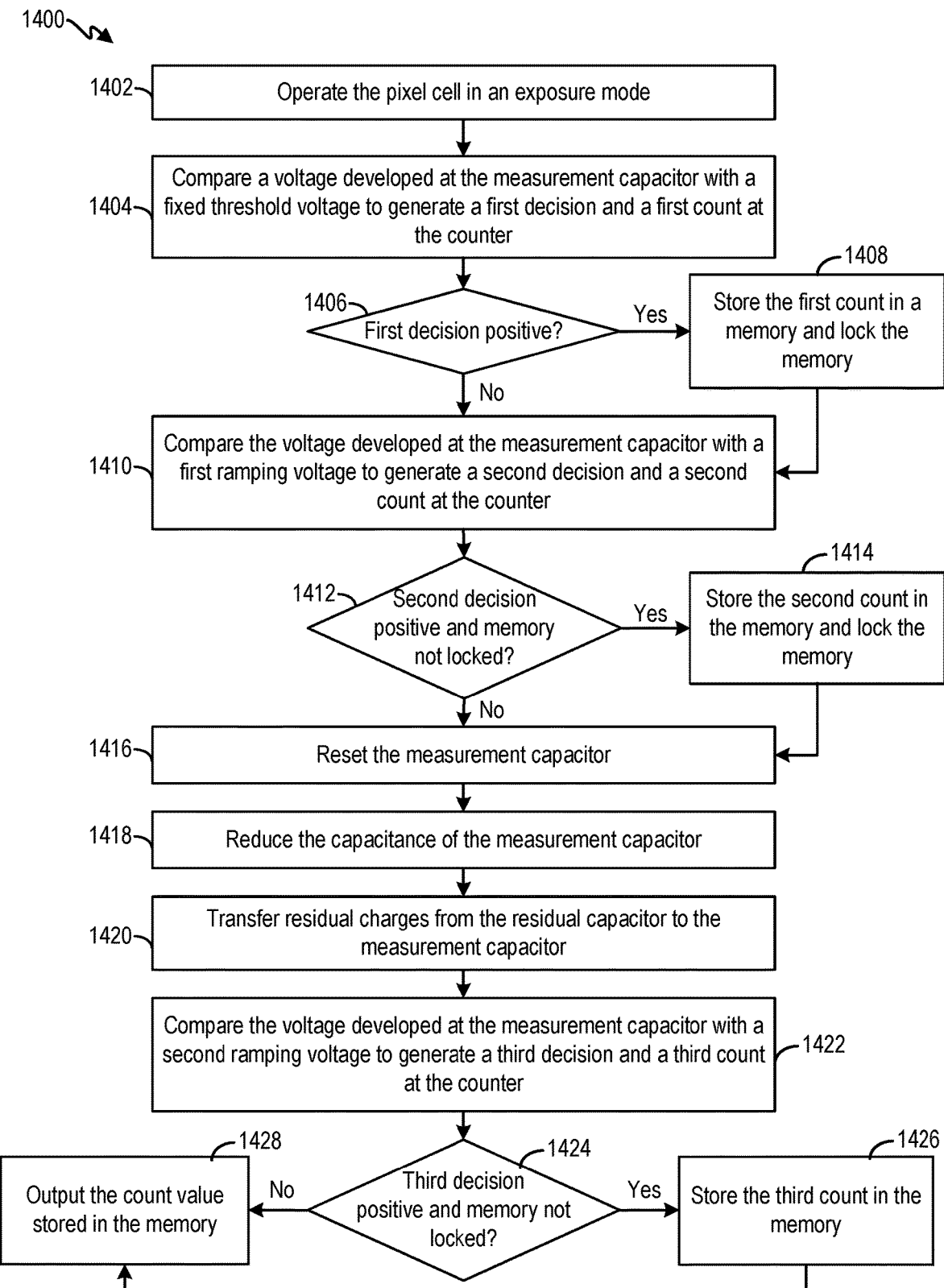
FIG. 14 illustrates an embodiment of a flowchart of a process for determining a light intensity.

FIG. 14 illustrates an embodiment of a flowchart of a process 1400 for determining incident light intensity at a pixel cell (e.g., pixel cell 700, pixel cell 1100, etc.). Process 1400 can be performed by a controller together with various components of pixel cell 700 and pixel cell 1100. Process 1400 begins in step 1402, where the pixel cell is operated in an exposure mode where the photodiode can transfer charges to the residual charge capacitor and/or the measurement capacitor. In step 1404, the pixel cell can be operated to compare a voltage developed at the measurement capacitor with a fixed threshold voltage to generate a first decision and a first count at the counter. Step 1404 can be the first measurement phase targeted for a high light intensity range, and the first count can represent a time-of-saturation measurement. If the first decision is positive (in step 1406), the pixel cell can proceed to step 1408 and store the first count in a memory and then lock the memory by asserting a first flag (e.g., FLAG_1), and then proceed to step 1410 to perform the second measurement phase. If the first decision is not positive, the pixel cell can also proceed directly to step 1410 to perform the second measurement phase.

In step 1410, the pixel cell is operated to compare the voltage developed at the measurement capacitor with a first ramping voltage to generate a second decision and a second count at the counter. Step 1410 can be the second measurement phase for a medium light intensity range. The pixel cell can then determine whether the second decision is positive, and whether the memory is not locked (e.g., based on first flag, FLAG_1 remains de-asserted), in step 1412. If the second decision is positive and the memory is not locked, the pixel cell can proceed to step 1414 and store the second count in the memory and lock the memory by asserting a second flag (e.g., FLAG_2), and then proceed to step 1416 to perform the third measurement phase. If the first decision is not positive, the pixel cell can also proceed directly to step 1416 to perform the third measurement phase.

In step 1416, as part of the third measurement phase, the pixel cell can reset the measurement capacitor to empty the stored charges. The pixel cell can also reduce the capacitance of the measurement capacitor to increase the charge-to-voltage conversion ratio, in step 1418. In step 1420, the pixel cell can transfer residual charges stored in the residual charge capacitor of the photodiode to the measurement capacitor. The pixel cell then proceeds to step 1422 to compare the voltage developed at the measurement capacitor with a second ramping voltage to generate a third decision and a third count at the counter. The pixel cell then proceeds to determine whether the third decision is positive and whether the memory is not locked (e.g., based on whether any one of first flag FLAG_1 and second flag FLAG_2 is asserted), in step 1424. If the third decision is positive and the memory is not locked, the pixel cell stores the third count in the memory in step 1426, and then proceeds to step 1428 to output the count value stored in the memory. On the other hand, if the third decision is not positive, or the memory has been locked, the pixel cell will proceed directly to step 1428 to output the count value (which can be one of the first count or the second count) stored in the memory. In some examples, step 1428 can be performed at a later time, and step 1428 need not be performed immediately following step 1424 or 1426.

Figure 15:
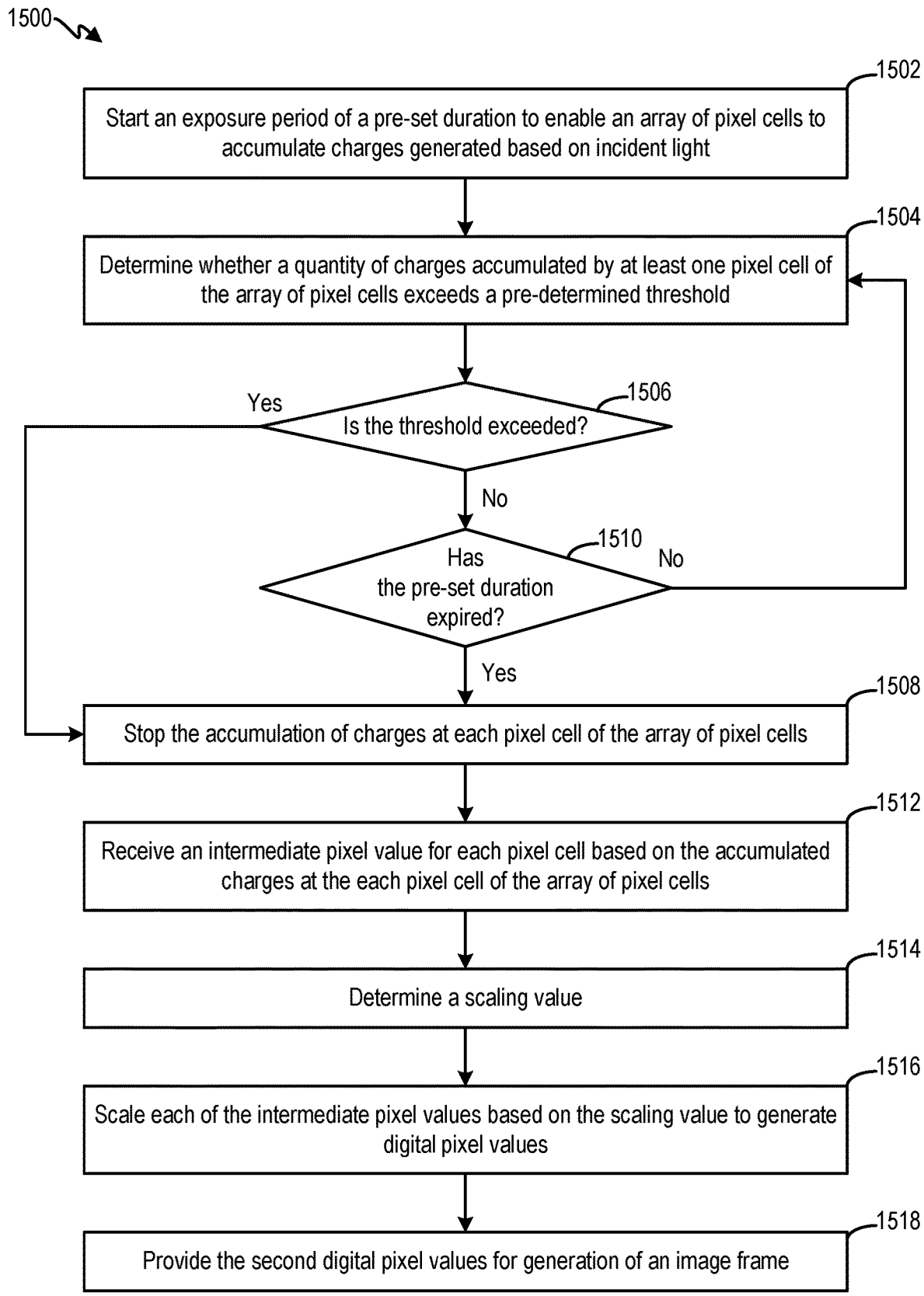
FIG. 15 illustrates an embodiment of a flowchart of a process for operating a pixel cell array.

FIG. 15 illustrates an embodiment of a flowchart of a process 1500 for operating an array of pixel cells. The array of pixel cells may include, for example, an array of pixel cell 700, an array of pixel cells 1100, etc. Process 1500 can be performed by a controller (e.g., controller 740) that interfaces with the array of pixel cells and with an ADC (e.g., ADC 710). Each pixel cell may perform, in conjunction with the ADC, process 1400 of FIG. 14. Process 1500 begins in step 1502, where the controller starts an exposure period of a pre-set duration to enable an array of pixel cells to accumulate charges generated based on incident light. The pre-set duration may be configured based on, for example, the capacity of the capacitor at pixel cell 700, an average ambient light intensity in the environment, the rate of charge generation of the photodiode for the average ambient light intensity, etc. The exposure period can be started by, for example, opening a mechanical shutter to expose the pixel cells to incident light, disabling a charge steering switch (e.g., shutter switch 704), and/or enabling a charge transfer switch (e.g., transfer gate 706), etc., to enable the capacitors at the pixel cells to accumulate charges.

In step 1504, the controller determines whether a quantity of charges accumulated by at least one pixel cell of the array of pixel cells exceeds a pre-determined threshold. The pixel cell array may be divided into multiple blocks of pixel cells, and the at least one pixel cell may include one pixel cell selected from each block of pixel cells. The same or different pixel cells can be selected for different exposure periods. The pre-determined threshold can be based on a fraction of a saturation limit of the capacitor of the at least one pixel cell. The determination of whether the quantity of charges accumulated by the at least one pixel cell of the array of pixel cells exceeds the pre-determined threshold can be based on, for example, an onset of saturation indication (e.g., FLAG_1 of FIG. 11) generated by a comparator.

If the quantity of charges exceeds the threshold (in step 1506), the controller may proceed to step 1508 to stop the accumulation of charges at each pixel cell of the array of pixel cells. On the other hand, if the quantity of charges does not exceed the threshold (in step 1506), the controller may proceed to step 1510 to determine whether the pre-set duration has expired. If the pre-set duration has not expired, the controller may proceed back to step 1504 to continue monitoring for onset of saturation at the at least one pixel cell. If the pre-set duration has expired, the controller may also proceed to step 1508 to stop the accumulation of charges at each pixel cell of the array of pixel cells. The stopping of the accumulation of charges can be performed by, for example, closing the mechanical shutter to shield the pixel cells from incident light, enabling the charge steering switch (e.g., shutter switch 704), and/or disabling a charge transfer switch (e.g., transfer gate 706), etc., to prevent the capacitors at the pixel cells from accumulating charges.

In step 1512, the controller may receive (e.g., from ADC 710), an intermediate pixel value for each pixel cell based on the accumulated charges at the each pixel cell of the array of pixel cells. The intermediate pixel values may be generated based on the time-to-saturation output in the first phase of measurement, or based on the quantity of charges stored at the capacitor in the second or third phases of measurements.

In step 1514, the controller may determine a scaling value for scaling the intermediate pixel values. The scaling value can be determined based on, for example, a ratio between the duration of the adjusted exposure period and the duration of the default exposure period.

In step 1516, the controller may scale each of the intermediate pixel values using the scaling value to generate a set of digital pixel values, and provide the digital pixel values to an image processor for generation of an image frame in step 1518.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
   an array of pixel cells, each pixel cell including:
      a photodiode configured to generate charge upon receiving incident light and to accumulate a first part of the charge as residual charge until the photodiode saturates; and
      a capacitor configured to accumulate a second part of the charge generated by the photodiode as overflow charge; and
   a controller configured to:
      start an exposure period to enable the photodiode and the capacitor of each pixel cell of the array of pixel cells to accumulate, respectively, residual charge and overflow charge;
      determine whether a quantity of the overflow charge accumulated by the capacitor of at least one pixel cell of the array of pixel cells since the exposure period starts exceeds a pre-determined threshold; and
      based on a determination that the quantity of overflow charge accumulated by the capacitor of the at least one pixel cell exceeds the pre-determined threshold:
         end the exposure period of the array of pixel cells,
         generate an output pixel value for each pixel cell of the array of pixel cells, the output pixel value for the at least one pixel cell being generated based on measuring a duration for the quantity of the overflow charge to exceed the pre-determined threshold, the output pixel values for other pixel cells of the array of pixel cells being generated based on a quantity of the charge generated at each of the other pixel cells within the exposure period; and
         provide the output pixel values for generation of an image frame.

2. The apparatus of claim 1, wherein the controller is further configured to generate the output pixel values of the other pixel cells based on:
   determining an intermediate pixel value for each of the other pixel cells based on the quantity of the charge generated at each of the other pixel cells;
   determining a scale value based on a duration of the ended exposure period; and
   scaling each of the intermediate pixel values using the scale value to generate the output pixel values.

3. The apparatus of claim 1, wherein the pre-determined threshold is set based on an intensity range of incident light that saturates the capacitor of the at least one pixel cell.

4. The apparatus of claim 1, wherein the pre-determined threshold is set based on a capacity of the capacitor of the at least one pixel cell.

5. The apparatus of claim 1, further comprising:
   one or more analog-to-digital converters (ADC) configured to perform at least one of: measuring the duration for the quantity of the overflow charge to exceed the pre-determined threshold at a pixel cell, or measuring the quantity of charge generated within the exposure period at a pixel cell, to generate an output pixel value for the pixel cell; and
   a selection module configured to couple each pixel cell of the array of pixel cells sequentially to the one or more ADCs to generate the digital pixel value for the pixel cell.

6. The apparatus of claim 5, wherein the controller is configured to:
   select a pixel cell from the array of the pixel cells as the at least one pixel cell;
   control the selection module to couple the selected pixel cell to the one or more ADCs to determine whether a quantity of overflow charge accumulated at the capacitor of the selected pixel cell in the exposure period exceeds the pre-determined threshold; and
   responsive to determining that the quantity of charges accumulated at the selected pixel cell exceeds the pre-determined threshold, end the exposure period.

7. The apparatus of claim 6, wherein the controller is configured to select the same pixel cell in a subsequent exposure period to determine whether the quantity of overflow charge accumulated at the capacitor of the pixel cell in the subsequent exposure period exceeds the pre-determined threshold.

8. The apparatus of claim 6, wherein the controller is configured to select a different pixel cell from the array of the pixel cells in a subsequent exposure period to determine whether the quantity of overflow charge accumulated at the capacitor of the different pixel cell in the subsequent exposure period exceeds the pre-determined threshold.

9. The apparatus of claim 6, wherein the controller is configured to select the pixel cell in the exposure period based on the quantity of overflow charge accumulated at the capacitor of of the pixel cell exceeding the pre-determined threshold in a prior exposure period.

10. The apparatus of claim 6, wherein the controller is configured to select the pixel cell based on a random function.

11. The apparatus of claim 1, wherein each pixel cell includes an analog-to-digital converter (ADC) configured to perform at least one of: measuring the duration for the quantity of the overflow charge to exceed the pre-determined threshold at a pixel cell, or measuring the quantity of charge generated within the exposure period at a pixel cell, to generate an output pixel value for the pixel cell; and
wherein the controller is configured to:
monitor for an indication, from the ADC of the at least one pixel cell, that the quantity of the overflow charge accumulated by the capacitor of the at least one pixel cell exceeds the pre-determined threshold; and
end the exposure period for each pixel cell based on receiving the indication.

12. The apparatus of claim 1, wherein the exposure period has a default end time;
wherein the controller is configured to end the exposure period before the default end time based on the determination that the quantity of the overflow charge accumulated by the capacitor of the at least one pixel cell exceeds the pre-determined threshold; and
wherein the default end time is preset based on an ambient light intensity.

13. The apparatus of claim 1, wherein the array of pixel cells is a first array of pixel cells;
wherein the apparatus further comprises a second array of pixel cells; and
wherein the controller is configured to:
start the exposure period at a first time for the first array and for the second array;
end the exposure period at a second time for the first array; and
end the exposure period at a third time different from the second time for the second array.

14. A method comprising:
starting an exposure period to enable a photodiode and a capacitor of each pixel cell of an array of pixel cells to accumulate, respectively, residual charge and overflow charge, the residual charge and the overflow charge, the residual charge being a first part of the charge generated by the photodiode upon receiving incident light until the photodiode saturates, the overflow charge being a second part of the charge;
determining whether a quantity of the overflow charge accumulated by the capacitor of at least one pixel cell of the array of pixel cells since the exposure period starts exceeds a pre-determined threshold; and based on determining that the quantity of overflow charge accumulated by the capacitor of the at least one pixel cell exceeds the pre-determined threshold:
ending the exposure period of the array of pixel cells;
generate an output pixel value for each pixel cell of the array of pixel cells, the output pixel value for the at least one pixel cell being generated based on measuring a duration for the quantity of the overflow charge to exceed the pre-determined threshold, the output pixel values for other pixel cells of the array of pixel cells being generated based on a quantity of the charge generated at each of the other pixel cells within the exposure period; and
providing the output pixel values for generation of an image frame.

15. The method of claim 14, wherein generating the output pixel values of the other pixel cells comprises:
determining an intermediate pixel value for each of the other pixel cells based on the quantity of the charge generated at each of the other pixel cells;
determining a scale value based on a duration of the ended exposure period; and
scaling each of the intermediate pixel values using the scale value to generate the output pixel values.

16. The method of claim 14, wherein the pre-determined threshold is set based on an intensity range of incident light that saturates the at capacitor of the least one pixel cell.

17. The method of claim 14, wherein the pre-determined threshold is set based on a capacity of the capacitor of the at least one pixel cell.

18. The method of claim 14, wherein the output pixel values are generated using an analog-to-digital converter (ADC).

19. The method of claim 18, further comprising:
selecting a pixel cell from the array of the pixel cells as the at least one pixel cell;
controlling the ADC to determine whether a quantity of overflow charge accumulated by the capacitor of the selected pixel cell exceeds the pre-determined threshold; and
responsive to determining that the quantity of the overflow charge accumulated by the capacitor of the selected pixel cell exceeds the pre-determined threshold, ending the exposure period.

20. The method of claim 19, wherein the same pixel cell is selected in a subsequent exposure period to determine whether the quantity of overflow charge accumulated at the capacitor of the pixel cell in the subsequent exposure period exceeds the pre-determined threshold.

21. The method of claim 19, wherein different pixel cells are selected in a first exposure period and in a second exposure period of the plurality of exposure periods.

22. The method of claim 19, wherein the pixel cell is selected in the exposure period based on the quantity of overflow charge accumulated at the capacitor of of the pixel cell exceeding the pre-determined threshold in a prior exposure period.

23. The method of claim 19, wherein the pixel cell is selected based on a random function.

* * * * *